United States Patent
Andrews et al.

(10) Patent No.: US 10,642,589 B2
(45) Date of Patent: *May 5, 2020

(54) EXTENSIBILITY IN A DATABASE SYSTEM

(71) Applicant: MemSQL, Inc., San Francisco, CA (US)

(72) Inventors: Michael Adam Andrews, San Francisco, CA (US); Andrew John Paroski, San Francisco, CA (US); Eric Norman Hanson, Bellevue, WA (US)

(73) Assignee: MemSQL, Inc., San Francisco, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/457,688

(22) Filed: Mar. 13, 2017

(65) Prior Publication Data

US 2018/0260196 A1  Sep. 13, 2018

(51) Int. Cl.
| | |
|---|---|
| *G06F 9/44* | (2018.01) |
| *G06F 8/41* | (2018.01) |
| *G06F 16/242* | (2019.01) |
| *G06F 16/2453* | (2019.01) |

(52) U.S. Cl.
CPC .......... *G06F 8/447* (2013.01); *G06F 16/242* (2019.01); *G06F 16/2453* (2019.01)

(58) Field of Classification Search
CPC combination set(s) only.
See application file for complete search history.

(56) References Cited

U.S. PATENT DOCUMENTS

| | | | |
|---|---|---|---|
| 5,742,810 A | 4/1998 | Ng et al. | |
| 5,799,310 A | 8/1998 | Anderson et al. | |
| 5,875,334 A | 2/1999 | Chow et al. | |
| 6,978,261 B2 | 12/2005 | Cotner et al. | |
| 6,985,904 B1 | 1/2006 | Kaluskar et al. | |
| 7,631,293 B2 * | 12/2009 | Alcorn ................... | G06F 8/315 |
| | | | 717/108 |

(Continued)

OTHER PUBLICATIONS

United States Non-final Office Action dated Feb. 5, 2019 for U.S. Appl. No. 15/474,787.

*Primary Examiner* — Duy Khuong T Nguyen
(74) *Attorney, Agent, or Firm* — EIP US LLP

(57) ABSTRACT

A method includes receiving a user-defined extension configured to operate on data from a content database and comprising code expressed in a first programming language, the user-defined extension comprising at least one unresolved object and a function calling the at least one unresolved object. On a first pass through the user-defined extension code, each respective unresolved object is bound to a respective placeholder object such that the function calls each respective placeholder object and each respective placeholder object is mapped to the respective unresolved object, and delaying evaluation of the user-defined extension code until a second pass through the user-defined extension code. On the second pass, machine code corresponding to a compiled version of the user-defined extension is obtained by sequentially obtaining machine code for each respective unresolved object as each respective placeholder is called in the function. A related system and non-transitory computer-readable medium are also provided.

31 Claims, 19 Drawing Sheets

(56) References Cited

U.S. PATENT DOCUMENTS

| | | | |
|---|---|---|---|
| 7,752,197 B2* | 7/2010 | Dettinger | G06F 16/2428 |
| | | | 707/721 |
| 7,933,916 B2 | 4/2011 | Dolin et al. | |
| 8,713,049 B2 | 4/2014 | Jain et al. | |
| 9,836,507 B2 | 12/2017 | Hu et al. | |
| 2004/0193575 A1 | 9/2004 | Chen et al. | |
| 2005/0149907 A1* | 7/2005 | Seitz | G06F 12/0875 |
| | | | 717/108 |
| 2006/0200486 A1 | 9/2006 | Castro et al. | |
| 2008/0022265 A1 | 1/2008 | Morris | |
| 2008/0134207 A1 | 6/2008 | Chamieh et al. | |
| 2009/0083219 A1* | 3/2009 | Zane | G06F 8/30 |
| 2013/0031139 A1* | 1/2013 | Chen | G06F 16/2443 |
| | | | 707/802 |
| 2013/0198166 A1* | 8/2013 | Prout | G06F 16/24524 |
| | | | 707/718 |
| 2013/0198231 A1* | 8/2013 | Skidanov | G06F 16/2471 |
| | | | 707/770 |
| 2013/0198232 A1* | 8/2013 | Shamgunov | G06F 16/2471 |
| | | | 707/770 |
| 2014/0280030 A1* | 9/2014 | Freedman | G06F 16/24542 |
| | | | 707/718 |
| 2016/0335062 A1* | 11/2016 | Teodorescu | G06F 16/9024 |

* cited by examiner

300

```
create table t1(a int, ts timestamp);
create table t2(a int, ts timestamp);
...

create or replace procedure myMove() as
declare
  boundary timestamp
    = date_add(now(), interval -5 minute);
begin
  insert into t2 select * from t1 where ts < boundary;
  delete from t1 where ts < boundary;
end;
```

```
400 delimiter //
-- Return a version of the input string normalized to remove
-- leading and trailing blanks, with one space between words,
-- and all lower case.
create or replace function normalize_string(str varchar(255)) returns
varchar(255) as
declare
  r varchar(255) = ""; i int; previousChar char; nextChar char;
begin
  str = lower(trim(str));
  if length(str) = 0 then return str; end if;
  previousChar = substr(str, 1, 1);
  r = concat(r, previousChar);
  i = 2;
  while i <= length(str) loop
    nextChar = substr(str, i, 1);
    if not(previousChar = ' ' and nextChar = ' ') then
      r = concat(r, substr(str, i, 1));
    end if;
    previousChar = nextChar;
    i += 1;
  end loop;
  return r;
end; //
```
450

```
memsql> select normalize_string("   Abc   XYZ  "); //
+----------------------------------------+
| normalize_string("   Abc   XYZ  ")     |
+----------------------------------------+
| abc xyz                                |
+----------------------------------------+
```

FIG. 4

500
```
create table t (i int);
insert into t values (1),(2),(3),(4),(5);
create function tablevalue(l int) returns table as
return select * from t limit l;
```
550
```
memsql> select * from tablevalue(0);
Empty set (0.00 sec)
memsql> select * from tablevalue(2);
+------+
|  i   |
+------+
|   3  |
|   2  |
+------+
```
FIG. 5

```
-- pick any arbitrary value from input
delimiter //
create function any_init() returns int as
  begin
     return -1;
  end;//
create function any_iter(s int, v int) returns int as
  begin
     return v;
  end;//
create function any_merge(s1 int, s2 int) returns int as
  begin
    if s1 = -1 then return s2; else return s1; end if;
  end;//
create function any_terminate(s int) returns int as
  begin
     return s;
  end;//
delimiter ;

create aggregate any_val(int)
  returns int
  with state int
  initialize with any_init
  iterate with any_iter
  merge with any_merge
  terminate with any_terminate;        ⟵ 650 create table t(g int, x int);
insert into t values (100, 10), (100, 12), (100, 14), (200, 21), (200,
27);

select g, any_val(x) from t group by g;

memsql> select g, any_val(x) from t group by g;
+------+------------+
| g    | any_val(x) |
+------+------------+
|  100 |         10 |
|  200 |         27 |
+------+------------+
```

FIG. 6

```
 1 drop database if exists db;
 2 create database db;
 3 use db;
 4
 5 create table t (i int);
 6 insert into t values (1),(2),(3),(4),(5);
 7 create table t2 (i int);
 8 insert into t2 values (2), (4);
 9 drop all from plancache;
10
11 delimiter //
12
13 create procedure basic() as
14     declare num int = 3;
15     declare select_1_and_2 table(i int) = select i from t where i < num;
16     declare indirection_table table(i int) = select * from select_1_and_2;
17     declare select_from_indirection table(i int) = select * from indirection_table
              where indirection_table.i != 2;
18     begin
19         num = 4;
20         insert into t select * from select_from_indirection; -- insert 1
21     end //
22 call basic() //
23 select * from t //
```

| SQL function | SKELETAL function FORM (PARAMETERIZED SQL) |
|---|---|
| 1210 Select * from stock where id in(1,2,12) | Select * from stock where id in (<@>) — 1215a |
| | Select * from stock where <C> in (<@>) — 1215b |
| | Select * from <T> where <C> in (<@>) — 1215c |
| 1220 Select price from stock where id=5 | Select price from stock where id=<@> — 1225a |
| | Select price from stock where id in (<@>) — 1225b |
| | Select <C1> from stock where <C2>=<@> — 1225c |
| | Select <C1> from <T> where <C2>=<@> — 1225d |
| 1230 Select sum(price) from stock where id in(5,6,7) | Select sum(price) from stock where id in(<@>) — 1235a |
| | Select sum(<C1>) from stock where <C2> in(<@>) — 1235b |
| | Select <F>(<C1>) from stock where <C2> in(<@>) — 1235c |
| | Select price from stock where id in(<@>) AS List; SUM (List) — 1235d |

| skeletal function | | LOCATION |
|---|---|---|
| S1 KEY | S1 function FORM | SC17 |
| S2 KEY | S2 function FORM | SC23 |
| S3 KEY | S3 function FORM | SS13 |
| 1312 ⋮ | 1314 ⋮    1316 ⋮ | |
| Sn KEY | Sn function FORM | SXx |

```
declare 100000:ScanTable0: fn(`exprs1`: exprs_t1*, `context2`: context_t1*, `xact3`:
Transaction*, `foundRowParam6`: bool*) bool <-
{
    {
        foreach (`rowPtr0` in VS(rcIndex=0, indexOrdinal=0, takeRowLocks=0))
            using transaction `xact3`
        {
            (*(`exprs1`)).state1 <- `rowPtr0`
            {
                if (TFN2Bool[EqSignedSigned[(*(*(`exprs1`)).state1).`i`<OptSigned@32>,
param0<OptSigned>]])
                {
                    if (call NetworkProcessFn0()) return 1
                }
                else { }
            }
        }
        return 0
    }
}
```

1500

```
Function 5 <100000:ScanTable0>:

Locals:
    local  rvToReturn: offset=0   size=8   align=8   type=int64_t
    local rvToReceive: offset=16  size=16  align=16  type=uint128_t
    param hiddenRvParam: offset=32  size=8  align=8  type=bool*
    param       exprs: offset=40  size=8  align=8
       type={ state1: { VersionedNode: { vnHeader: VersionedNode,
              links: { 1 * LockFreeSListNodeGeneric } },
              i: { value: int32_t,  opt: Opt pack(4) },  : int64_t }* }*
    ...

0x0000  DerefN           local=&xact_1   local=&xact   i32=8
  0x0010  Literal8         local=&local_1   i64=0
  0x0020  VSIterInit       local=&iter_1   i32=0   i32=0   i32=0   local=xac
t_1
                           i32=0   local=local_1
                           i32=0   local=local_1
  0x0040  VSIterHasMore    local=&local_2   local=&iter_1   target=0x0204
  0x0050  JumpIfFalse      local=local_2   target=0x01c4
  0x005c  GetfunctionContext   local=&xact_2
  0x0064  VSIterGetRowPtr  local=&rowPtr_1   local=&iter_1
  0x0070  Lea              local=&local_3   local=exprs   i32=0
  0x0080  AssignN          local=local_3   local=&rowPtr_1   i32=8
  0x0090  Lea              local=&local_9   local=exprs   i32=0
  0x00a0  DerefN           local=&local_8   local=local_9   i32=8
  0x00b0  Lea              local=&local_7   local=local_8   i32=32
  0x00c0  GetIntNull       local=&local_6   local=local_7
  0x00cc  ParamSigned      local=&local_10   i64=0
  0x00dc  EqSignedSigned   local=&local_5   local=&local_6  local=&local_1
0
  0x00ec  TFN2Bool         local=&andValue_1   local=&local_5
  0x00f8  Copy1            local=&orValue_1   local=andValue_1
  0x0104  Copy1            local=&local_4   local=orValue_1
  0x0110  JumpIfFalse      local=local_4   target=0x017c
  0x011c  CallManaged      func=1
<100000:NetworkProcessFn0>  target=0x01fc
                           local=&local_11   local=exprs
                           local=&local_11   local=exprs   local=context
  ...
```

FIG. 15

| | MBC FUNCTION | LOCATION |
|---|---|---|
| M1 KEY | M1 FUNCTION FORM | M17 |
| M2 KEY | M2 FUNCTION FORM | M23 |
| M3 KEY | M3 FUNCTION FORM | M4 |
| ⋮ | ⋮ | ⋮ |
| Mn KEY | Mn FUNCTION FORM | Mx |

```
define linkonce_odr i64 @"100000:ScanTable0"(i8* nocapture, %exprs_t1* nocapture,
%context_t1*, %class.Transaction*, i8* nocapture readnone) #7 !dbg !13 {
EntryBlock:
  %local_3.i = alloca %struct.OptSigned, align 8
  %iter_1 = alloca %class.VSLIterator, align 8
  %9 = bitcast %class.VSLIterator* %iter_1 to i8*, !dbg !18
  call void @llvm.lifetime.start(i64 160, i8* %9), !dbg !18
  call void @opVSIterInit(%class.VSLIterator* nonnull %iter_1, i32 0, i32 0, i32 0,
%class.Transaction* %3, i32 0, i64 0), !dbg !18
  %6 = getelementptr inbounds %class.VSLIterator, %class.VSLIterator* %iter_1, i64
0, i32 0, i32 0, i32 6, i32 0, i32 0, !dbg !18
  %7 = load %class.RefCounted*, %class.RefCounted** %6, align 8, !dbg !18
  %8 = icmp eq %class.RefCounted* %7, null, !dbg !18
  br i1 %8, label %opVSIterHasMore.exit2, label %.critedge7, !dbg !18
```

FIG. 17

EXTENSIBILITY IN A DATABASE SYSTEM

BACKGROUND OF THE INVENTION

Field of the Invention

The present application relates to database searching and, more specifically, methods and systems for increasing the efficiency of search queries and functions called on database systems.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to submit a "query" or call one or more functions in a query language for searching, organizing, retrieving and/or manipulating information that satisfies particular function parameters. Often, the user's function is a sequence of queries or functions that are sequentially applied.

In a typical database management system, a query language interpreter compiles a given query or functions into a pseudo-code, also known as p-code, which is then interpreted, executes the code, and then proceeds to compile the next query or function. Such step-wise compilation of query or function language into machine code that is directly executable on a processing system typically consumes a significant amount of computational time. Moreover, because most queries or functions are unique, in that they are typically generated to solve a particular problem, for example to locate a particular information item, or to create or manipulate a particular grouping of information, each query or function is generally interpreted, compiled and executed independently of prior queries or functions. The cumulative effect of having to use a compiler to generate the executable code for each query or function may be substantial, resulting in poor performance for all users, as the system spends more time and more resources compiling and generating code than in actually executing the code to execute each query or function. Accordingly, it would be advantageous to reduce the time required to return results of user queries or functions against database management systems.

SUMMARY

A method is provided. The method includes receiving a user-defined extension configured to operate on data from a content database and comprising code expressed in a first programming language, the user-defined extension comprising at least one unresolved object and a function calling the at least one unresolved object. The method includes, on a first pass through the user-defined extension code, binding each respective unresolved object to a respective placeholder object such that the function calls each respective placeholder object and each respective placeholder object is mapped to the respective unresolved object, and delaying evaluation of the user-defined extension code until a second pass through the user-defined extension code. The method includes, on the second pass through the user-defined extension code, obtaining machine code corresponding to a compiled version of the user-defined extension by sequentially obtaining machine code for each respective unresolved object as each respective placeholder is called in the function. The method includes executing the machine code corresponding to the compiled version of the user-defined extension, thereby performing at least one operation on the data of the content database.

A non-transitory computer readable medium comprising instructions is provided. When executed by a processing system, the instructions cause the processing system to receive a user-defined extension configured to operate on data from a content database and comprising code expressed in a first programming language, the user-defined extension comprising at least one unresolved object and a function calling the at least one unresolved object. When executed by a processing system, the instructions cause the processing system to, on a first pass through the user-defined extension code, bind each respective unresolved object to a respective placeholder object such that the function calls each respective placeholder object and each respective placeholder object is mapped to the respective unresolved object, and delay evaluation of the user-defined extension code until a second pass through the user-defined extension code. When executed by a processing system, the instructions cause the processing system to, on the second pass through the user-defined extension code, obtain machine code corresponding to a compiled version of the user-defined extension by sequentially obtaining machine code for each respective unresolved object as each respective placeholder is called in the function. When executed by a processing system, the instructions cause the processing system to execute the machine code corresponding to the compiled version of the user-defined extension, thereby performing at least one operation on the data of the content database.

A system comprising a processing system is provided. The processing system is configured to receive a user-defined extension configured to operate on data from a content database and comprising code expressed in a first programming language, the user-defined extension comprising at least one unresolved object and a function calling the at least one unresolved object. The processing system is configured to, on a first pass through the user-defined extension code, bind each respective unresolved object to a respective placeholder object such that the function calls each respective placeholder object and each respective placeholder object is mapped to the respective unresolved object, and delay evaluation of the user-defined extension code until a second pass through the user-defined extension code. The processing system is configured to, on the second pass through the user-defined extension code, obtain machine code corresponding to a compiled version of the user-defined extension by sequentially obtaining machine code for each respective unresolved object as each respective placeholder is called in the function. The processing system is configured to execute the machine code corresponding to the compiled version of the user-defined extension, thereby performing at least one operation on the data of the content database.

BRIEF DESCRIPTION OF THE DRAWINGS

FIG. 4 illustrates example code and a returned result for a SQL user-defined function extension, in accordance with some embodiments;

FIG. 5 illustrates example code and a returned result for a SQL table-valued function extension, in accordance with some embodiments;

FIG. 6 illustrates example code and a returned result for a SQL user-defined aggregate extension, in accordance with some embodiments;

FIG. 9 illustrates example code for one or more SQL extensions utilizing eager binding and lazy execution, in accordance with some embodiments;

FIG. 12 illustrates an example set of search functions and corresponding parameterized skeletal functions, in accordance with some embodiments;

FIG. 13 illustrates an example data structure for identifying the location of previously compiled skeletal functions corresponding to identified skeletal function forms, in accordance with some embodiments;

FIG. 15 illustrates an excerpt of MemSQL Byte Code (MBC), in accordance with some embodiments;

FIG. 16 illustrates an example data structure for identifying the location of previously compiled intermediate byte code, e.g., MBC, in accordance with some embodiments;

FIG. 17 illustrates an excerpt of Low Level Virtual Machine (LLVM) bit code, in accordance with some embodiments;

DETAILED DESCRIPTION OF CERTAIN INVENTIVE EMBODIMENTS

Figure 1:
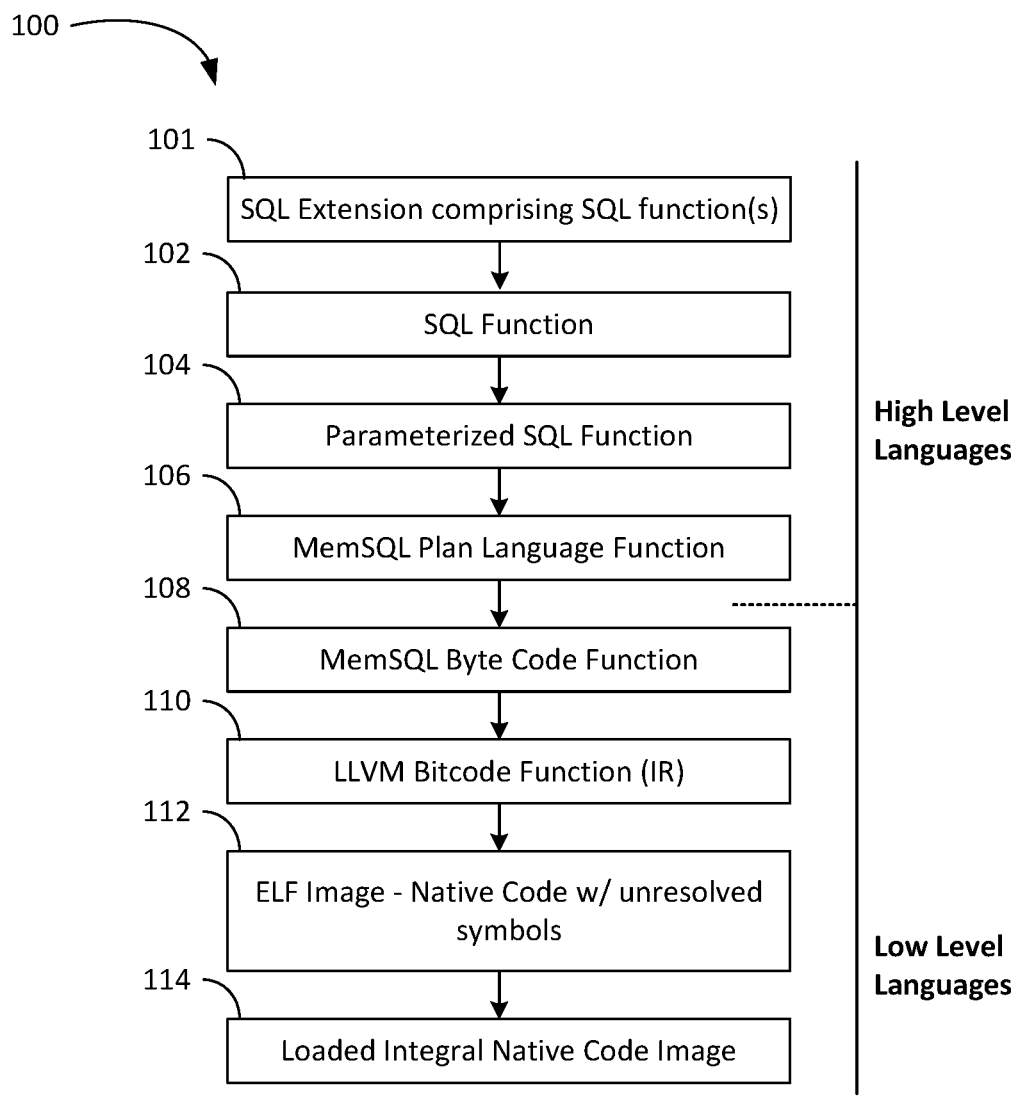
FIG. 1 illustrates a flowchart of general sequential transformations and processing of a user-defined extension defining at least one function performed on a content database, in accordance with some embodiments.

In the following description, for purposes of explanation rather than limitation, specific details are set forth such as the particular architecture, interfaces, techniques, etc., in order to provide a thorough understanding of the concepts described herein. However, it will be apparent to those skilled in the art that the other embodiments may be practiced, which depart from these specific details. Similarly, the present application is directed to example embodiments as illustrated in the FIGS., and is not intended to limit any claimed invention beyond the terms expressly included in the claims. For purposes of simplicity and clarity, detailed descriptions of well-known devices and methods are omitted so as not to obscure the description with unnecessary detail. However, the lack of any description for any particular device or method does not necessarily indicate that it or its function are well-known.

The FIGS. describe example query processing systems using the paradigm of a database query system that processes queries and functions formed using the operations and format of the standard Structured Query Language (SQL). One of skill in the art will recognize, however, that the principles described herein may be applied for the processing of queries and execution of functions in other programming languages as well.

As noted above, in a common database query language, there are an unlimited number of different forms of queries or functions that may be submitted by a user. Conventional query language interpreters are configured to parse each query or function into a series of more primitive operations. However, any particular user of the query language is likely to use a limited subset of query or function forms, and as such, may often repetitively use the same form of a query or function, albeit with different function parameters, or may apply the same query to different databases. Similarly, different users in the same organization, or different users of the same database, may use the same query forms, albeit with different function parameters. For the purpose of this disclosure, the terms "database", "database management system", and "data warehouse" may all be understood to correspond to substantially the same entities.

In the following FIGS. various queries, functions, and code are described as comprising high-level programming languages and/or low-level programming languages. For the purpose of definition, a high-level programming language is amenable to the way people think and read, and to how programmers program. Such tasks as memory management (e.g., freeing, deleting, or creating objects and memory) are generally automatically managed in the background and generally do not require explicit definition in the high-level code itself. Thus, for high-level programming languages, many variables and conditions are implied. For example, the use of IF/THEN/ELSE, FOR, or WHILE statements, may be called in high-level languages and the control flow, or specific steps involved in carrying out such algorithms, are handled automatically without being explicitly defined in the code statement itself. Thus, high-level programming languages are generally easier to program in, since there are far fewer variables and states that must be explicitly defined, tracked and accounted for, and because the code more closely resembles spoken language.

On the other hand, low-level programming languages are not as easy to maintain and program in comparison to high-level programming languages at least because low-level programming languages generally do not self-manage memory or control flow. Far fewer variables and states are implied, meaning they have to be explicitly defined, tracked and accounted for. For example, compound statements such as IF/THEN/ELSE, FOR, or WHILE statements are not directly supported. Instead low-level programming languages generally progress sequentially from line to line, executing conditional or non-conditional commands, unless a jump command or a return command, for example, instructs the processor to jump from a particular line of code to some other non-sequential line of code. Moreover, the lowest low-level programming languages, for example, native or machine code or low level virtual machine bitcode, generally define registers rather than variables and, in some cases, may operate on memory directly.

The term compile may indicate generating code in a lower-level programming language than the programming language on which that generated code is based, while the term decompile may indicate the reverse operation. The term transpile may indicate generating code in a programming language having a level similar to a level of the code from which the generated code is based.

Moreover, in the past, an old computer software compiler's adage, that you could choose any two of fast execution time, fast compile time, and short software development time but not all three, was considered a general rule. However, based on the below description, the inventors have provided embodiments that provide for all three simultaneously.

FIG. 1 illustrates a flowchart 100 of general sequential transformations and processing of a user-defined extension 101 defining at least one function 102 performed with respect to a content database, in accordance with some embodiments. Transformations and/or compilations will be described briefly in connection with FIG. 1, but may be discussed in more detail in connection with one or more of the following FIGS.

Flowchart 100 begins with a user-defined SQL extension 101. However, user-defined SQL extension 101 could also be defined in a programming language other than SQL. User-defined SQL extension 101 comprises at least one SQL function 102. SQL function 102 is converted, or transpiled, to a parameterized SQL function 104, which comprises a form of the function, hereinafter termed the "skeletal" form of the function, and placeholders for any particular parameters that may be associated with the function. Parameterizing and identification of a skeletal function form will be described in more detail in connection with at least FIGS. 11-13.

Parameterized SQL function 104 may be compiled into one or more MemSQL plan language (MPL) functions 106 corresponding to and configured to provide the intended result of parameterized SQL function 104. MPL is a new, simple, tightly managed high-level programming language designed specifically for MemSQL, which is a custom-designed structured query language, rather than for general purpose applications. In such a compilation from SQL function to MPL, fast compile times may be achieved since SQL operator trees are converted directly to MPL abstract syntax trees, eliminating the need for computationally expensive parsing and semantic resolution at function compilation time, which decreases compiling time for a function. In addition, because MPL is a high-level programming language, it is more efficient to program and work in for the vast majority of human programmers, further providing short software development times. For example, being a high-level programming language, MPL does not require explicit definition of, e.g., create and/or destroy functions for particular objects or memory allocations, thereby automating control flow and memory management processes and reducing programming costs and the frequency of programming errors and/or mistakes. In some other embodiments, parameterized SQL function 104 could be compiled into a high-level programming language other than MPL without diverging from the scope of the present application.

MPL function(s) 106 may then be compiled into one or more corresponding MemSQL Byte Code (MBC) functions 108. MBC, as a byte code or interpreted code, is a compact, low-level programming language that can easily be serialized, interpreted or transformed to low level virtual machine (LLVM) bit code. Interpreting MBC directly nearly eliminates the first-time computational cost of executing a function, thereby offering a substantial decrease in required compilation time and increasing the speed at which a solution may be returned for any particular function that must first be compiled.

MBC functions 108 may then be compiled into LLVM bit code functions 110. LLVM bit code functions 110 may be considered an intermediate representation of MBC functions 106 configured to run on a low-level virtual machine. The use of LLVM allows programmers to program on the backbone of well-established virtual machine constructions, code bases and handlers, thereby leveraging previous programming in the compiler space.

LLVM bit code functions 110 may then be compiled into an executable and linkable format (ELF) image comprising native code, also known as machine code, and at least one unresolved symbol. Of course, embodiments where no unresolved symbols are included in the compiled ELF image are also contemplated. Native or machine code may be very low level code that is executable directly on a processing system, for example, on one or more processors. The unresolved symbols may be symbols that do not have intrinsically defined meanings in native or machine code but, instead, indicate memory addresses where additional native or machine code associated with one or more functions is currently stored. By including the one or more unresolved symbols in the ELF image, essentially as a form of shorthand, the additional stored native or machine code need not be transcribed inline in the compiled ELF image, thereby providing a new way in which to reduce computational resources and the associated execution time during compilation of a function.

ELF image 112 may then be loaded for direct execution by one or more processors in the form of a loaded integral native or machine code image 114. For example, the one or more unresolved symbols may be replaced with the memory address to which it corresponds such that during execution of loaded integral native or machine code image 114, a processor will step through the ELF image machine code sequentially and, when the memory address is reached, jump to that memory address and read the additional native or machine code directly from that memory address. The process briefly and generally described in connection with FIG. 1 will be described in more detail in connection with FIG. 11 below.

Figure 2:
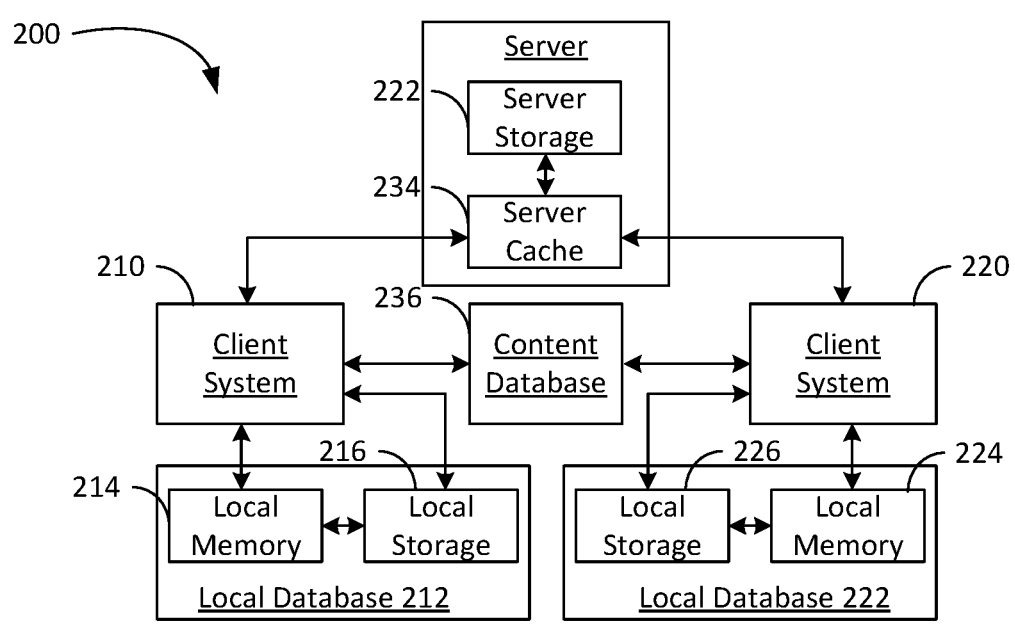
FIG. 2 illustrates a block diagram of a system for carrying out a user-defined function on a content database, in accordance with some embodiments.

FIG. 2 illustrates a block diagram of a system 200 for executing a function on a content database 236, in accordance with some embodiments. In this example, two client systems 210, 220 communicate with a server cache 234 to obtain compiled skeletal functions, and/or compiled MBC functions, that facilitate querying, organizing or manipulating content database 236. In some embodiments, each of client systems 210, 220 may comprise at least the features that will be described within processing system 1126 of FIG. 11. In some other embodiments, one or more features described within processing system 1126 of FIG. 11 may be omitted and/or one or more additional features not described may further be present. One of skill in the art will also recognize that the number of client systems and server caches may differ from this example embodiment, for example, only one client system or any number of client systems greater than two.

Each client 210, 220 includes local storage 216, 226 for persistent storage of previously compiled SQL extensions, functions and/or compiled associated MBC functions, and local memory 214, 224 into which these compiled extensions and functions may be loaded for execution by client system 210, 220. When client system 210, 220, executes a compiled extension and/or function, with or without function parameters specific to the particular extension or function, the content database 236 is accessed and the requested operation is carried out and/or the requested result is provided to the requesting client system 210, 220.

Server cache 234 may be configured to store other compiled skeletal functions and/or compiled MBC functions at server storage 232. For example, as each client 210, 220 creates a new compiled skeletal function and/or compiled associated MBC function, it may forward a copy to server cache 234. Thereafter, each client 210, 220 is able to retrieve and use a compiled skeletal function and/or MBC function that was created by a different client.

Optionally, because server storage 232 may include all of the compiled skeletal extensions, functions and/or compiled MBC functions, regardless of origin, the use of local storage 216, 226 at client systems 210, 220 may be optional. That is, some or all of the client systems may rely on retrieving all compiled extensions, skeletons and/or compiled MBC functions from server storage 232, via server cache 234, for example.

One of skill in the art will recognize that the use of server cache 234 is also optional, in that client systems 210, 220 may be configured to access server storage 232 directly. Preferably, server cache 234 provides faster access to the compiled extensions, skeletons and/or complied MBC functions by keeping recently accessed, or frequently accessed, extensions, skeletons and/or MBC functions available at server cache 234, thereby avoiding the need to access server storage 232, which is likely to have slower retrieval times. Accordingly, in some embodiments, any of databases 1152, 1154, 1156, or 1158 of FIG. 11 may correspond to or exist integrally in any one of local memories 214, 224, local storages 216, 226, server cache 234, or server storage 232 of FIG. 2, or alternatively in a distributed database across any combination of the same. Similarly, content database 1160 of FIG. 11 may correspond to content database 236 of FIG. 2. Discussion will now proceed to examples of user-defined SQL extensions in connection with FIGS. 3-8.

High level programming languages, such as structured query language (SQL), further include a set of user-defined extensions that can be defined and utilized by programmers to query, organize and/or manipulate data. These extensions include, but are not limited to, stored procedures (SPs), user-defined (scalar) functions (UDFs), table-valued functions (TVFs), and user-defined aggregate functions (UDAFs). These extensions are programmer/developer friendly in that their syntax is clean (e.g., does not include symbols such as @, $, etc.). Conventionally, such extensions would be translated to a pseudocode that is then interpreted by a p-code interpreter. However, this is a time and computationally intensive process. Certain embodiments described herein compile extensions down to native or machine code, without the use of a conventional compiler, persist that machine code to memory, cache or storage, and reuse the saved machine code on subsequent invocations and/or executions of the extension rather than recompiling a particular extension each time it is invoked and/or executed.

The solutions proposed herein also provide a qualitative, rather than merely a quantitative, advantage. Conventional handling of extensions have historically not allowed the return of a result within 200 milliseconds (ms) because translation to pseudocode and p-code interpretation are too computationally intensive. By contrast, present embodiments described herein easily meet this standard at least due to the fact that, after the first compilation to machine code, subsequent retrievals of corresponding already-compiled machine code are able to be executed much faster. Returning a result within 200 ms is qualitatively different, from the perception of a user, compared to returning a result in much longer than 200 ms because human perception of a delay of less than 200 ms is generally perceived as instantaneous, whereas longer delays are perceived by human users as not being instantaneous.

Figure 3:
FIG. 3 illustrates example code for a SQL stored procedure extension, in accordance with some embodiments.

FIG. 3 illustrates example code 300 for a SQL stored procedure extension, in accordance with some embodiments. Generally, SPs generate logic to query or update tables. As shown, SQL extension code 300 defines an SP called myMove( ) that moves entries from one table (table t1) to another table (table t2) when data in any first table entry is more than 5 minutes old. Of course, code 300 is only an example and a stored procedure may perform any of a virtually unlimited number of procedures on content stored in a content database.

FIG. 4 illustrates example code 400 and a returned result 450 for a SQL user-defined function (UDF) extension, in accordance with some embodiments. UDFs may accept one or more parameters and return a scalar value. As shown, SQL extension code 400 defines a UDF called normalize_string (str) which accepts a character string (str) and returns a version of str that removes any leading and trailing blank spaces, ensures a single space between words, and ensures all letters are lowercase. FIG. 4 further shows the normalized result 450 "abc xyz" of the UDF for str="Abc XYZ". Of course, code 400 is only an example and a user-defined function may define any of a virtually unlimited number of functions executed on any number of input parameters and/or content stored in a content database.

FIG. 5 illustrates example code 500 and a returned result for a SQL table-valued function (TVF) extension, in accordance with some embodiments. TVFs may accept one or more parameters and return a table of values. Among other possibilities, TVFs may be called anywhere in the FROM clause of a query. As shown, SQL extension code 500 defines a table (t) and a TVF called tablevalue(1) that accepts an integer (1) and returns a table containing "1" values from table "t". FIG. 5 further shows the result 550 of two executions of code 500, a first evaluating tablevalue(0) and a second evaluating tablevalue(2). Of course, code 500 is only an example and a TVF may define any of a virtually unlimited number of table-valued functions executed on any number of input parameters and/or content stored in a content database.

FIG. 6 illustrates example code 600 and a returned result 650 for a SQL user-defined aggregate function (UDAF) extension, in accordance with some embodiments. UDAFs are essentially aggregates of UDFs corresponding at least to an initiation function (which sets the variables), an iteration function (which adds or operates on those variables), a merge function (which combines values), and a terminate function (which extracts an aggregate result). Examples of UDAFs include as examples, but are not limited to, sum, average, median, mean, mode, and standard deviation functions, bounding_box functions, which find a box that minimally surrounds a set of input boxes, area_intersection functions, which find a polygon that is the intersection of a set of input polygons, or regression_line functions, which return the slope and offset of a linear regression line plotted through a set of points. As shown, SQL extension code 600 defines a UDF any_init( ) that returns the integer −1, a UDF any_iter(s, v) that defines integers s and v and returns v, a UDF any_merge(s1, s2) that defines integers s1 and s2 and returns s2 if s=−1 and s2 otherwise, and the UDAF any_val (int) that defines and returns integer int, initializes with UDF any_init, iterates with UDF any_iter, merges with any_merge, and terminates with any_terminate. Result 650 shows creation of table t defining integers g and x, insertion of a plurality of values into table t, and the returning a table grouped by g from t for any_val (x).

Figure 7:
FIG. 7 illustrates example code operating on a SQL array, in accordance with some embodiments.

The extension of SQL functions as described herein may also be extended to use with arrays and records, as described in connection with FIGS. 7 and 8 below. FIG. 7 illustrates example code 700 operating on SQL arrays, in accordance with some embodiments. As shown, SQL code 700 defines the function arrays ( ), which defines arrays b, c, d and e and returns text based on the particular combination of array entries from arrays c, d and e.

Figure 8:
FIG. 8 illustrates example code operating on a SQL record, in accordance with some embodiments.

FIG. 8 illustrates example code 800 for operating on a SQL record, in accordance with some embodiments. As shown, SQL code 800 defines the function build_record ( . . . ) which defines records a and b, each containing integers p and q and returns result=row (a.p, a.q, b.p, b.q).

Conventionally, any time a function is declared to be called on a variable, or the result of another function or expression, those variables, other functions or results of other functions are evaluated, e.g., compiled at the time they are called in the declaration. This is known as a "compilation-at-declaration" call process, which is computationally expensive and requires a halt in the compilation of the extension as a whole until the called argument variables, other functions, or results of the other functions, are compiled to pseudo-code, interpreted and returned. By contrast, in some embodiments described herein, eager binding and lazy evaluation are utilized during declaration of certain objects used by the extension.

Binding may be considered as mapping one object to another, while eager binding is the process of mapping a called uncompiled function or unresolved value to a placeholder object without actually evaluating, compiling or returning that called function or unresolved value at the time it is declared. This process allows a SQL function or extension to declare objects that are invoked on variables or subsets of data stored in objects that are not yet compiled or defined. Lazy evaluation is the resultant process of deferring evaluation of any bound functions or unresolved values until a line of code calls for evaluation, compilation or returning of a function or query that requires the definition and compilation of those bound functions and/or unresolved values, rather than performing the evaluation of such bound functions or unresolved values when declared. Such a combination of eager binding and lazy evaluation allows a SQL extension to be written more efficiently in that a particular table variable may be processed by the extension even though it has not yet been compiled or resolved, and to be compiled more efficiently in that any bound function or unresolved value may be declared at a first time and compiled at a second time later than the first time, when one or more functions are actually executed. This concept is described in more detail in connection with FIGS. 9 and 10 below.

FIG. 9 illustrates example code 900 for one or more SQL extensions utilizing eager binding and lazy execution, in accordance with some embodiments. Lines 1-3 of code 900 create and use a database db. Lines 5-9 create tables t and t2, and insert values into each. Lines 13-21 define a stored procedure basic( ). Line 22 calls the function basic( ), and line 23 selects all entries from table t, as modified by basic ( ). Looking back at the definition of basic( ) it can be seen that at line 14 the integer variable num is defined to have a value of 3. This is an example of a scalar variable.

At line 15, the table select_1_and_2 is declared a table variable comprising all entries of table t having position i less than num. Using the concept of eager binding and lazy evaluation, select i from t where i<num is not evaluated when called at line 15. Instead "select i from t where i<num" is mapped to a first placeholder object (e.g., [first object( )]) and select_1_and_2 is equated to this first placeholder object. In some embodiments, the value of num, here num=3, is bound to the first placeholder object such that any subsequent modifications to the scalar value num (see line 19) are not taken into account when evaluation and/or compilation of a function requiring resolution or determination of a row of table t is conducted (see insert at line 20)

At line 16, the table indirection_table is declared as a table variable including all entries of table select_1_and_2. Using the concept of eager binding and lazy evaluation, select * from select_1_and_2 is not evaluated when called at line 16. Instead "select * from select_1_and_2" is mapped to a second placeholder object (e.g., [second object( )]) and indirection_table is equated to this second placeholder object.

At line 17, the table select_from_indirection is declared as a table variable including all entries of table indirection_table except entry 2. Using the concept of eager binding and lazy evaluation, indirection_table where indirection_table.i !=2 is not evaluated when called at line 17. Instead "indirection_table where indirection_table.i !=2" is mapped to a third placeholder object (e.g., [third object( )]) and select_from_indirection is equated to this third placeholder object.

At line 20, the stored procedure basic( ) inserts all entries of the table select_from_indirection into table t. Using the concept of eager binding and lazy evaluation, "select * from select_from_indirection" is not evaluated when called at line 20. Instead "select * from select_from_indirection" is mapped to a fourth placeholder object (e.g., [fourth object ( )]).

This completes the first pass where all unresolved objects are bound to placeholder objects. At this point a second pass of the extension is performed during which the extension, or at least one function included therein, is compiled to machine code. For example, with respect to the present example including first, second, third, and fourth bound placeholder objects, line 20 may be shown, for ease of understanding, as a nested invocation of the first, second, third and fourth placeholder objects, namely: insert into t [fourth object([third object([second object([first object ( )])])])]. In compiling the insert function of line 20, the nested function insert into t [ fourth object([third object ([second object([first object( )])])])] may be unnested, and/or simplified, utilizing the information previously bound to each of the first through fourth placeholder objects, such that the insert function refers only to previously-defined tables (e.g., table t) or literal values (e.g., 3 and 2), for example, "select i from t where i<3 and i!=2". An example of how such eager binding and lazy evaluation may be applied generically will now be described in connection with FIG. 10.

Figure 10:
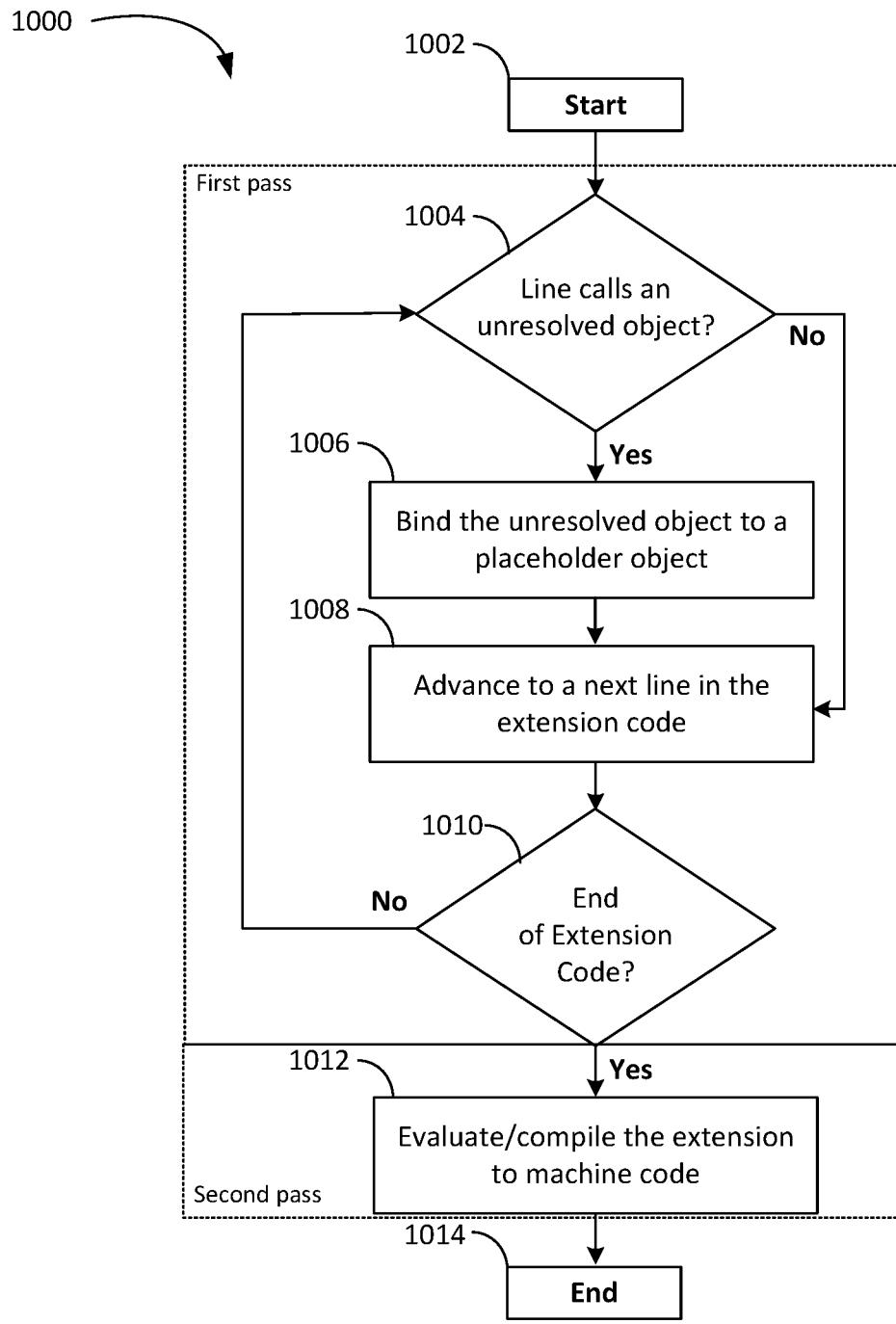
FIG. 10 illustrates a flowchart of a process for utilizing eager binding and lazy execution on a SQL extension, in accordance with some embodiments.

FIG. 10 illustrates a flowchart 1000 of a process for utilizing eager binding and lazy execution on a SQL extension, in accordance with some embodiments. Flowchart 1000 illustrates how at least a portion of evaluating and/or compiling a SQL extension may be carried out. Description of each block of flowchart 1000 will be described in connection with FIG. 9 for easy reference and not limitation. Evaluation and compilation follow a two-pass procedure, the first pass including blocks 1004, 1006, 1008 and 1010, where the SQL extension is stepped through one line of code at a time and any unresolved or as-yet undefined objects are bound to placeholder objects without explicit evaluation of the unresolved or as-yet undefined objects. The second pass includes block 1012 where explicit evaluation and compilation of the SQL extension occurs.

Flowchart 1000 begins at start block 1002 at a first line of code defining a SQL extension. This may correspond to line 1 in FIG. 9, where creation of the database db begins, or line 13, where the procedure basic( ) is first defined.

Flowchart 1000 advances from block 1002 to block 1004, which includes determining if the current line of code includes a call to an unresolved or as-yet undefined object. If the determination at block 1004 is NO, flowchart 1000 advances to block 1008, where evaluation advances one or more lines in the extension code. This would be the path taken from line 13, advancing to line 14 in FIG. 9.

If the determination at block 1004 is YES, flowchart 1000 advances to block 1006, which includes binding the unresolved object to a placeholder object such that the declared object now calls to the placeholder object. This would be the path taken at each of lines 14-17 in FIG. 9.

Flowchart 1000 advances from block 1006 to block 1008, which includes advancing at least one line in the extension code. Flowchart advances from block 1008 to block 1010, which includes determining if the end of the extension code has been reached. If the determination at block 1010 is NO, flowchart 1000 advances back to block 1004. This would be the path taken at each line until reaching line 20.

If the determination at block 1010 is YES, flowchart 1000 advances to block 1012, which includes evaluating and compiling the extension to machine code. For example, the unresolved objects, previously bound to placeholder objects, called by declared objects required to evaluate and/or compile each function of the extension to machine code are resolved and the functions of the extension are compiled to machine code. Such resolving of unresolved objects may comprise compiling and executing one or more functions required to define the unresolved objects utilizing the mapping of the placeholder object(s) to the undefined objects, as previously described in connection with line 20 of FIG. 9.

For example, at line 20 of FIG. 9, after the first pass line 20, now including the bound placeholder objects may be expressed as insert into t [fourth object([third object([second object([first object( )])])])], and may now be compiled in the same operation, by evaluating or compiling each unresolved function to which its respective placeholder object is bound as each placeholder object is encountered. Such an operation may function to unnest and/or simplify the nested function "insert into t [fourth object([third object([second object ([first object( )])])])]", utilizing the information previously bound to each of the first through fourth placeholder objects, such that the insert function refers only to previously-defined tables or literal values, for example, "select i from t where i<3 and i!=2". Alternatively, if the machine code corresponding to the respective unresolved function has previously been compiled and stored in memory, cache or storage, that machine code may be retrieved rather than recompiled, as will be described in more detail in connection with FIGS. 11-22 below. This process is cycled through until definition of each declared object and compilation of each function within the SQL extension has been completed.

Figure 11:
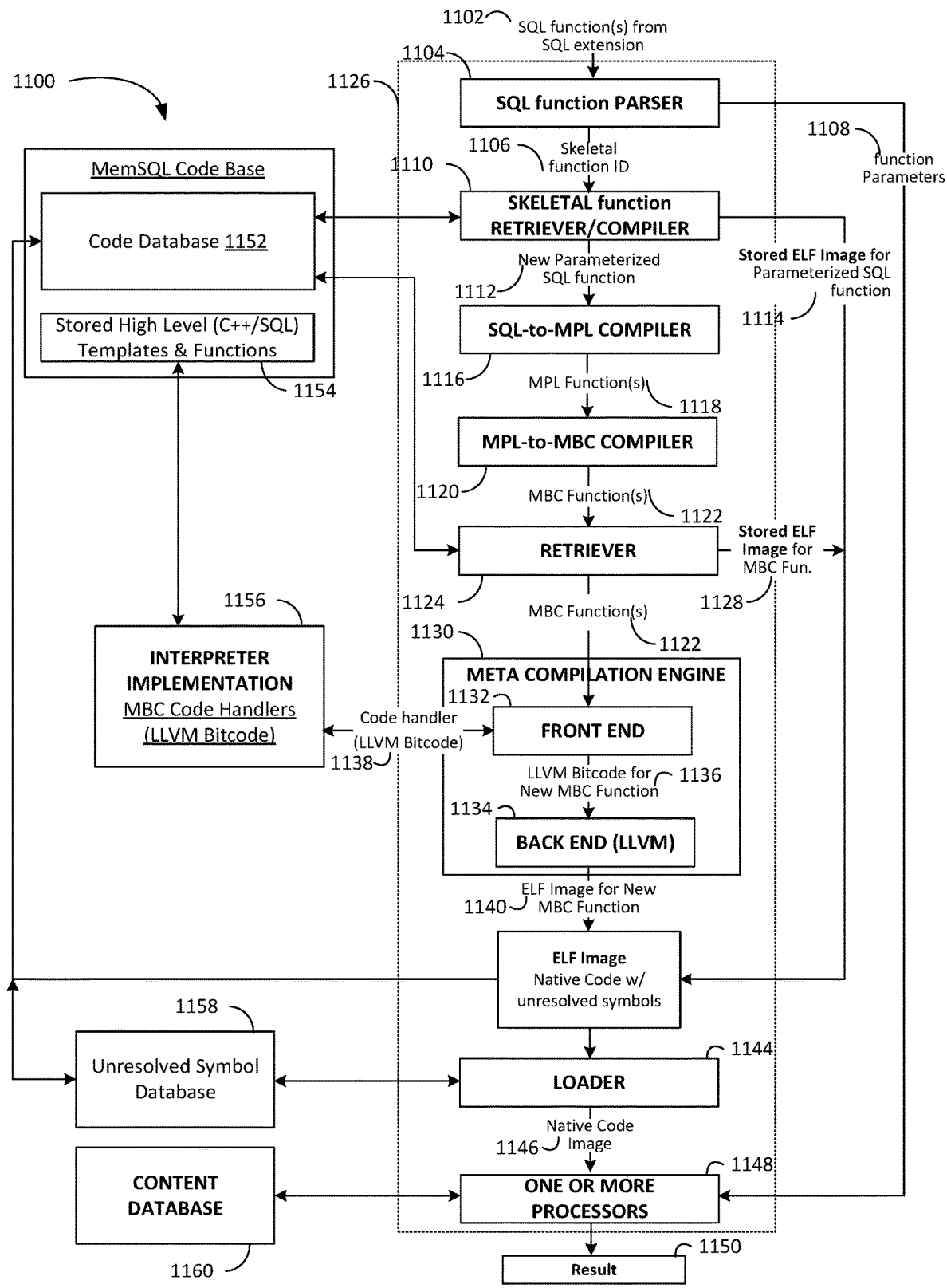
FIG. 11 illustrates a block diagram of the flow a processing system may traverse when executing a function performed on a content database, in accordance with some embodiments.

FIG. 11 illustrates a block diagram 1100 of the flow a processing system 1126 may traverse when executing a function on a content database 1160, in accordance with some embodiments. With respect to SQL extensions that may comprise one or more SQL functions, diagram 1100 may be traversed by processing system 1126 for each SQL function required to define and compile each declared object and each function within the SQL extension. Reference to FIGS. 9 and 10 are made at various points of the description corresponding to FIG. 11 for ease of understanding.

Processing system 1126 may include or be configured to run a MemSQL binary (e.g., compiled machine code) file, which may have been precompiled and shipped to or downloaded from a database by a client, which supports or executes the functions described below in connection with FIG. 11. In some embodiments, such databases may be a part of a network of servers configured to upload, store, and provide for download of software, sometimes referred to as the "cloud". For example, such cloud embodiments may include private clouds where the servers are either retained or maintained for a single company, a cluster cloud where a plurality of servers are maintained by a third-party cloud service (e.g., Amazon®, Azure®, Google®, etc.), or even on-premises where one or more software, code or programs are stored locally on a server, storage or memory of the client running the software, code or programs. Thus, the processes described in the present application may correspond to implementations of software as a service (SaaS).

As an example previously described in connection with FIG. 9, procedure basic( ) declared several objects in lines 15-17 (e.g., tables select_1_and_2, indirection_table, select_from_indirection) that were not evaluated or compiled at the time of declaration but were instead bound to first, second and third unresolved objects, respectively, as previously described for the first pass. These declared tables are not executed or compiled in the second pass until line 20, where an insert function required their definition. Thus, the order and timing of compiling and executing functions required to define declared objects within an extension is not necessarily tied to the order in which those objects are declared in the high level programming language code, but is instead tied to the time particular functions within an extension are called that require particular declared objects be defined for their compilation and execution.

Each of the declared tables in lines 15-17 are defined by executing a select function that selects data from a previously declared table or value (e.g., select i from t where i<num; select * from select_1_and_2; select * from indirection_table where indirection_table.i !=2, respectively). Accordingly, in order to ultimately execute the insert function of line 20, which itself requires execution of another select function (see line 20), each of the defining select functions in lines 15-17 (and also in line 20) must be compiled or their previously-compiled machine code retrieved from memory, cache or storage, as will be described in more detail below.

Thus, in order to compile the example extension basic( ) of FIG. 9, a SQL function 1102 illustrated in FIG. 11 may correspond, sequentially for each iteration through diagram 1100, to the insert function of line 20, then to the respective select statements of lines 20, 17, 16 and then 15, as bound fourth, third, second and first placeholder objects are evaluated sequentially at line 20 in FIG. 9, respectively, thereby unnesting and/or simplifying the nested insert function.

SQL function 1102 is parsed by a SQL function parser 1104 to identify the skeletal function form of SQL function 1102 and, optionally, one or more function parameters 1108 associated with SQL function 1102. SQL function parser 1104 passes a skeletal function identifier (ID) 1106 to a skeletal function retriever/compiler 1110.

With respect to parameterized SQL functions and their associated skeletal function forms, consider, for example, two functions, such as "Select all records in tableA, with name equal to 'smith', 'jones', or 'brown'", and "Select all records in tableA, with name equal to 'adams', 'nagle', 'harris', or 'kelly'". In SQL function parser 1104, each of these functions would likely invoke the same set of computer instructions, with the exception that in the first function, a search will be conducted for each of the three match values of 'smith', 'jones', or 'brown', and in the second function, a search will be conducted for each of the four match values of 'adams', 'nagle', 'harris', or ldly'.

In some embodiments, a skeletal form of this function may be of the form "Select all records in tableA, with name equal to one of <list>". When a compiled version of this skeletal function is created, it may be created in a parameterized form, wherein the particular list of match values is encoded as an argument to the compiled function. The particular list of match values is provided to the compiled function when the compiled function is invoked ("called"). In like manner, a skeletal form of this function may also include the identifier of the column as an argument, such as "Select all records in tableA, with <column>equal to one of <list>". Skeletal forms of SQL functions are discussed further in connection with FIGS. 12 and 13 below.

Skeletal function retriever/compiler 1110 then determines if an ELF image corresponding to the skeletal function ID is stored, e.g., available, in a code database 1152 and, if so, retrieves the corresponding ELF image 1114 from code database 1152 and passes it to a loader 1144. As shown in FIG. 11, a compiled skeletal function may include an ELF image comprising native or machine code and, in some embodiments, at least one unresolved symbol as previously described in connection with FIG. 1. Thus, if an ELF image corresponding to the skeletal Function ID has been previously stored, the function may not require recompiling to native or machine code, bypassing the associated time consuming compilation.

Although creating a compiled version of a single skeletal function may be more time and resource consuming than the conventional interpretation and decomposition of a function into a series of primitive operations, the potential savings in execution time using a compiled version of a function, and particularly, the potential savings in interpretation and execution time and resources when a compiled version is re-used, will generally provide for a substantial improvement in the overall execution of the user's functions.

It should be recognized that providing compiled versions of a function does not exclude the conventional use of un-compiled functions. If a particular function is deemed unsuitable for compilation, due to the complexity or uniqueness of the function, or a recognition that the conventional processing of this un-compiled function is sufficiently efficient, or other factors, the creation of a compiled version of the function may be bypassed (not shown in FIG. 11).

If an ELF image corresponding to skeletal function ID 1106 is not stored, e.g., available, in code database 1152, skeletal function retriever/compiler 1110 passes a new parameterized SQL function 1112 (i.e. the skeletal function and/or its new skeletal function ID) to a SQL-to-MPL compiler 1116, which generates, e.g., compiles, at least one MPL function 1118 corresponding to new parameterized SQL function 1112. As previously described, the use of MPL as an intermediate compiling iteration provides new benefits to the field of database functions, especially in-memory database functions, specifically, at least partly optimized compiling from MemSQL query language to MPL and short programming times at least by virtue of MPL being a high-level language that is easy for programmers to code in. SQL-to-MPL compiler 1116 passes MPL function(s) 1118 to an MPL-to-MBC compiler 1120, which generates, e.g., compiles, at least one MBC function 1122 corresponding to MPL function(s) 1118.

In some embodiments, MPL-to-MBC compiler 1120 passes MBC function(s) 1122 to a retriever 1124, which determines if native or machine code (e.g., an ELF image) 1128 corresponding to the particular MBC function(s) 1122 is stored, e.g., available, in code database 1152 and, if so, retrieves the previously stored ELF image 1128 from code database 1152 and passes it to loader 1144. If such a corresponding ELF image 1128 has been previously stored, MBC function(s) 1122 may not require recompiling to native or machine code, bypassing time consuming compilation. Accordingly, the process of storing machine code compiled based on particular MBC functions for subsequent retrieval provides a new way to reduce both compilation time and execution time for functions and extensions by allowing bypass of compilation of any previously stored MBC function.

As shown in FIG. 11, ELF image 1128 comprises native or machine code and, in some embodiments, at least one unresolved symbol as previously described in connection with FIG. 1. A check whether native or machine code has been previously stored may be made at the level of MBC, but generally not at the level of MPL, because the MBC functions, being a low-level language, will generally have explicitly defined the memory addresses of tables, variables, etc., and so such variables are explicitly accounted for. By contrast, MPL, being a high-level language, may not explicitly define such memory addresses, and so such variables are not explicitly accounted for. Thus, a search for matching MPL code is not generally guaranteed a one-to-one mapping to particular native or machine code, whereas a search for matching MBC code generally would be.

If such a corresponding ELF image 1128 is not stored, e.g., available, in code database 1152, retriever 1124 may pass the MBC function(s) 1122 to a meta compilation engine 1130 for compilation. In embodiments omitting retriever 1124, where MBC functions are not checked against previously stored ELF compilations, MPL-to-MBC compiler 1120 may directly pass MBC function(s) 1122 to meta compilation engine 1130.

Meta compilation engine 1130 may comprise a front end 1132, which may also be known to those of skill in the art as a "Clang" front end, or "CFE", and a back end 1134. An MBC program comprising MBC function(s) 1122 may be passed to front end 1132, which is configured to retrieve LLVM bitcode 1138 for MBC code handlers from a code database 1154 as required, generate, e.g., compile, corresponding LLVM bitcode 1136 for or based on MBC function(s) 1122, and pass LLVM bitcode 1136 to back end 1134. Back end 1134 is configured to, based on LLVM bitcode 1136 corresponding to MBC function(s) 1122, generate, e.g., compile, an ELF image 1140 comprising native or machine code and one or more unresolved symbols, as previously described, and pass EFL image 1140 to loader 1144. In some embodiments, ELF image 1140 may also be saved to local memory, local storage, server cache, or server storage, for example, to code database 1152 for retrieval and use for a subsequent matching function. This persisting of ELF image 1140 to storage or cache provides a new benefit in addition to the time savings of retrieval over recompilation. If power is lost, all code and information is self-contained in the ELF and, therefore, problems associated with locations of objects, registers, etc. being in a different location than their last volatile memory location may be substantially eliminated, further improving function execution timescales. In addition, to further reduce function compilation time, MBC code handlers, which tell the meta compilation engine 1130 how to compile MBC to LLVM bitcode may be compiled to LLVM bitcode 1138 offline, in advance, and may be shipped to or downloaded from a database, for example a database maintained in the cloud, by the client in a pre-compiled format, for example as an interp_ops.bc file, even though the actual MBC functions themselves may be compiled in the client's machine if not previously compiled and saved on a per function basis. Thus, time is saved from not having to compile the MBC code handlers before passing them to meta compilation engine 1130. Such a pre-compiled format may be made available in connection with software as a service (SaaS). The MemSQL binary file (the machine code file that runs this entire process) is precompiled and sent to the client.

Loader 1144 may retrieve a memory address at which additional native or machine code corresponding to each unresolved symbol, including those in ELF image 1114, 1128, 1140 is located and replace each unresolved symbol with the respective memory address. For such operations, loader 1144 may include RuntimeDyld logic, which is a library for loading ELF images, that executes or supports retrieving the memory addresses and replacing the unresolved symbols therewith. In some embodiments, loader 1144 may comprise a wrapper for the RuntimeDyld logic. Accordingly, the inclusion of the unresolved symbol, and/or that symbol's later replacement by the respective memory address provides a new way in which to reduce compilation and/or execution time, namely elimination of the requirement for transcribing the additional native or machine code associated with the symbol directly into the ELF image. Loader 1144 may further output the native or machine code image 1146 to one or more processors 1148.

One or more processors 1148 may then, optionally, retrieve the at least one function parameter 1108 if originally parsed by SQL query parser 1104, insert the at least one function parameter 1108 into native or machine code 1146 and execute native or machine code 1146, thereby returning a result 1150 of the original function satisfying the at least one function parameter 1108.

The following description of FIGS. 12 and 13 has been previously described, at least in part, in U.S. Pat. Nos. 9,135,310 B2, 9,141,678 B2 and 9,317,552 B2, the contents of which are hereby incorporated by reference in their entirety.

FIG. 12 illustrates an example set of search functions and corresponding parameterized skeletal functions, in accordance with some embodiments. The first function 1210 is a SQL function that returns all of the records (rows) in the table "stock" that have a value of 1, 2, or 12 in the column "id". This function includes the SQL operational terms of: Select, From, and Where; and has parameters "*" (entire record), "stock", "id", and the match values of 1, 2, and 12.

A variety of skeletal functions 1215a-1215c, and others, may be defined from the user function 1210, depending upon the particular features of the embodiment of SQL function parser 1104 (FIG. 11). Some embodiments of SQL function parser 1104 may parameterize each of the parameters "stock" (the particular table), "id" (the particular column within the table), and "1, 2, 12" (the particular value to be matched to the value in the identified column of the table).

An embodiment of SQL function parser 1104 may be configured to parameterize the values that are to be matched, as illustrated by the example function form 1215a. The SQL operational terms "Select", "From", and "Where", and the parameters "*", "stock", and "id" are included as integral parts of the function form 1215a, whereas the value parameters "1, 2, and 12" are represented by an argument "<@>". Given a compiled version of function form 1215a, the compiled function can be used for any search of the stock table for records having particular id values, by passing the particular match values as arguments of the compiled function. To accommodate different sets of match values, including a different number of values included for matching, the value parameters may be passed to the compiled function as elements of a variable length list.

In some more complex embodiments, SQL function parser 1104 may be configured to also include the column to be searched as an argument in the function form, as illustrated by the "<C>" argument in the function form 1215b. In further embodiments of SQL function parser 1104, the table to be searched may also be passed as an argument in the function form, as illustrated by the "<T>" argument in the function form 1215c.

Function 1220 includes an additional parameter "price" in the function. In contrast to the "*" parameter in function 1210, which returns the entire record for all records that have the specified id value, function 1220 will return only the value of the price entry in the record for all records that have the specified id value. Function 1220 also includes a single value "5" that is to be matched with the value of id in the stock table.

In some embodiments of SQL function parser 1104, this price parameter is included as an integral element in the skeletal function form, as illustrated in function form 1225a. The particular value ("5") of the id parameter that is to be matched is included as an argument ("<@>") to the function form 1225a, allowing this compiled function to find the price of any particular id value. FIG. 12 also illustrates alternative skeletal function forms 1225b-1225d that may be formed to satisfy function 1220 in more complex embodiments of the SQL function parser 1104.

In like manner, FIG. 12 illustrates alternative function forms 1235a-1235d that may be formed to satisfy function 1230. Of particular note, function 1230 includes a function "sum(price)". In the example skeletal forms 1230a-1230c, this function is considered a parameter of the skeletal function form. Alternatively, recognizing that function operations are often performed after the records are selected, the SQL function parser 1104 may be configured to partition a function that includes a function call to provide a result into a sequence of operations, such as an operation (function) that identifies the values that are to be provided to the function, followed by the operation of this function on these values, as illustrated by the example function form 1235d. In this example, all of the prices in the table stock having an id matching an entry in the argument list "<@>" are returned in a list named "List", using the "Select . . . AS<name>" option. This returned list is then passed to a "SUM" function that provides a sum of the returned prices in List.

One of skill in the art will recognize that any particular embodiment of SQL function parser 1104 of FIG. 11 will parse each user's function so as to produce a particular skeletal function with a potential combination of parameters without arguments and parameters with arguments (parameters that are passed as arguments to the skeletal function). For a user's function to be characterized as corresponding to a previously defined skeletal function, the form of the function must match the skeletal function with the defined operations and parameters without arguments (hereinafter the skeletal function form), and provide parameters that can be passed to the skeletal function as arguments that are consistent with this particular skeletal function form. For example, SQL function parser 1104 identifies and generates the skeletal function of 1215a that will characterize a subsequent user function of the form "Select * from stock where id in ( . . . )" as a function that corresponds to skeletal function 1215a with defined operations "Select", "from", "where" and "in", and parameters without arguments"*", "stock", and "id". The values within the parentheses following the "in" operation are the parameters that are passed as arguments ("<@>") to the compiled skeleton function corresponding to skeletal function 1215a.

FIG. 13 illustrates an example data structure 1300 for identifying the location of previously compiled skeletal functions corresponding to identified skeletal function forms, in accordance with some embodiments. The data structure 1300 may be stored in a server, for example, code database 1152 (FIG. 11). In FIG. 13, each compiled skeleton includes a description of the skeletal function 1310, and a location 1320 at which the compiled skeleton may be found.

When a client submits a compiled skeleton to code database 1152, it may include a description of the skeleton (the aforementioned skeletal function form of parameters without arguments) and a description/list of the parameters with arguments, which code database 1152 may include as the skeletal function form 1314 directly, or after some pre-processing for compatibility among clients. When a client subsequently submits a request for a compiled skeleton having this skeletal function form, code database 1152 initiates a search for a matching skeletal function form 1314.

To facilitate the search for a matching skeletal function form, code database 1152 may use one or more skeleton "keys" 1312 that serve to reduce the range of the search or otherwise increase the speed of the search. For example, in some embodiments, the skeletal functions may be ordered based on the order of function commands in the skeleton. Functions starting with "Select" may be grouped together, and within that grouping, are ordered based on the next command or parameter (e.g. "<F>", "*", etc.), with further sub-groups based on the subsequent commands or parameters. Given an ordered list of skeletal function keys 1312, conventional search techniques may be applied to quickly determine whether a matching skeleton key 1312 and corresponding matching skeleton function form 1314 is located in code database 1152. If a match is found, the location field 1320 identifies where the compiled version of the requested skeletal function form may be found.

Other ordering and search techniques will be apparent to one of skill in the art. For example, the skeletal function key 1312 may be a hash value that is created from a hash of the skeletal function form 1314, and conventional hash table techniques may be used to determine the location of the complied version of the skeletal function, as detailed above.

The location field 1320 may identify a location in a cache of code database 1152, if the requested skeletal form has been recently accessed, or is frequently accessed, or a location in storage of code database 1152. In some alternative embodiments, a storage location at the client that created the compiled skeleton may be cited for locating the compiled skeleton, reducing or eliminating the need for code database 1152 as an external memory structure. That is, instead of submitting the compiled version to code database 1152, a client that creates the compiled version may merely submit the skeletal function form 1314, and an identification of where the compiled version may be obtained from this client. One of skill in the art will recognize that any of a variety of architectures may be used for dynamically storing and retrieving copies of compiled versions of skeletal functions based on an identification of a corresponding skeletal function form, as detailed herein.

Figure 14:
FIG. 14 illustrates an excerpt of MemSQL Plan Language (MPL) code, in accordance with some embodiments.

FIG. 14 illustrates an excerpt 1400 of MemSQL Plan Language (MPL) code, in accordance with some embodiments. Excerpt 1400 is a portion of MPL generated for a parameterized, e.g., skeletal, SQL function "select * from t where i=@". As previously discussed, MPL is a high-level programming language. Thus, portions of its syntax are more readable in that they correspond to words of the English language. MPL further supports control flow algorithms, such as the depicted "foreach" and "if" functions. However, in order to provide control flow, memory management, as well as other functions automatically and impliedly handled in the background, MPL code must be compiled to a collection of more primitive operations.

FIG. 15 illustrates an excerpt of MemSQL Byte Code (MBC), in accordance with some embodiments. Excerpt 1500 is a portion of MBC generated for a parameterized, e.g., skeletal, SQL function "select * from t where i=@". Excerpt 1500 corresponds to MBC generated based on the higher level MPL language excerpt 1400 depicted in FIG. 14. As previously discussed, MBC is a low-level programming language. Thus, as depicted, in order to provide control flow, memory management, as well as other functions automatically and impliedly handled in the background by MPL, MBC must explicitly define more variables, e.g., "DerefN", "Literal8", "VSIterInit", "VSIterHasMore", etc. Moreover, MBC includes a greater incidence of code similar to native or machine code, e.g., "0x0000 DerefN", "0x0010 Literal8", etc.

FIG. 16 illustrates an example data structure 1600 for identifying the location of previously compiled intermediate byte code, e.g., MBC, in accordance with some embodiments. The data structure 1600 may be stored in a server, for example, code database 1152 (FIG. 11). In FIG. 16, each compiled byte code includes a description of the byte code 1610, and a location 1620 at which the compiled byte code may be found.

When a client submits a compiled byte code to code database 1152, it may include a description of the byte code and a description/list of the parameters with arguments, which code database 1152 may include as the byte code form 1614 directly, or after some pre-processing for compatibility among clients. When a client subsequently submits a request for a compiled byte code having this byte code form, code database 1152 initiates a search for a matching byte code form 1614.

To facilitate the search for a matching byte code form, code database 1152 may use one or more byte code "keys" 1612 that serve to reduce the range of the search or otherwise increase the speed of the search. For example, in some embodiments, the compiled byte code may be ordered based on the order of commands in the byte code. Given an ordered list of byte code keys 1612, conventional search techniques may be applied to quickly determine whether a matching byte code key 1612 and corresponding matching byte code function form 1614 is located in code database 1152. If a match is found, the location field 1620 identifies where the compiled version of the requested byte code form may be found.

Other ordering and search techniques will be apparent to one of skill in the art. For example, the byte code key 1612 may be a hash value that is created from a hash of the byte code form 1614, and conventional hash table techniques may be used to determine the location of the complied version of the byte code, as detailed above.

The location field 1620 may identify a location in a cache of code database 1152, if the requested byte code form has been recently accessed, or is frequently accessed, or a location in storage of code database 1152. In some alternative embodiments, a storage location at the client that created the compiled byte code may be cited for locating the compiled byte code, reducing or eliminating the need for code database 1152 as an external memory structure. That is, instead of submitting the compiled version to code database 1152, a client that creates the compiled version may merely submit the byte code form 1614, and an identification of where the compiled version may be obtained from this client. One of skill in the art will recognize that any of a variety of architectures may be used for dynamically storing and retrieving copies of compiled versions of byte code functions based on an identification of a corresponding byte code form, as detailed herein.

FIG. 17 illustrates an excerpt 1700 of Low Level Virtual Machine (LLVM) bit code, in accordance with some embodiments. Excerpt 1700 is a portion of LLVM bitcode generated for a parameterized, e.g., skeletal, SQL function "select * from t where i=@". Excerpt 1600 corresponds to LLBM bitcode generated based on the MBC language excerpt 1500 depicted in FIG. 15, which is based on the MPL language excerpt 1400 depicted in FIG. 14. As previously discussed, LLVM bitcode is a low-level programming language. Thus, as depicted, the programming language itself looks even less like the English language, instead relying on syntax, more similar to native or machine code, and that is configured to run on a virtual machine, e.g., "7=load % class.RefCounted*, % class.RefCounted** %6, align 16, !dbg !18".

The following FIGS. 18-22 describe, in more detail, processes that may be followed when returning a result of a function, as previously described in connection with FIG. 11 and in accordance with some embodiments of the present application.

Figure 18:
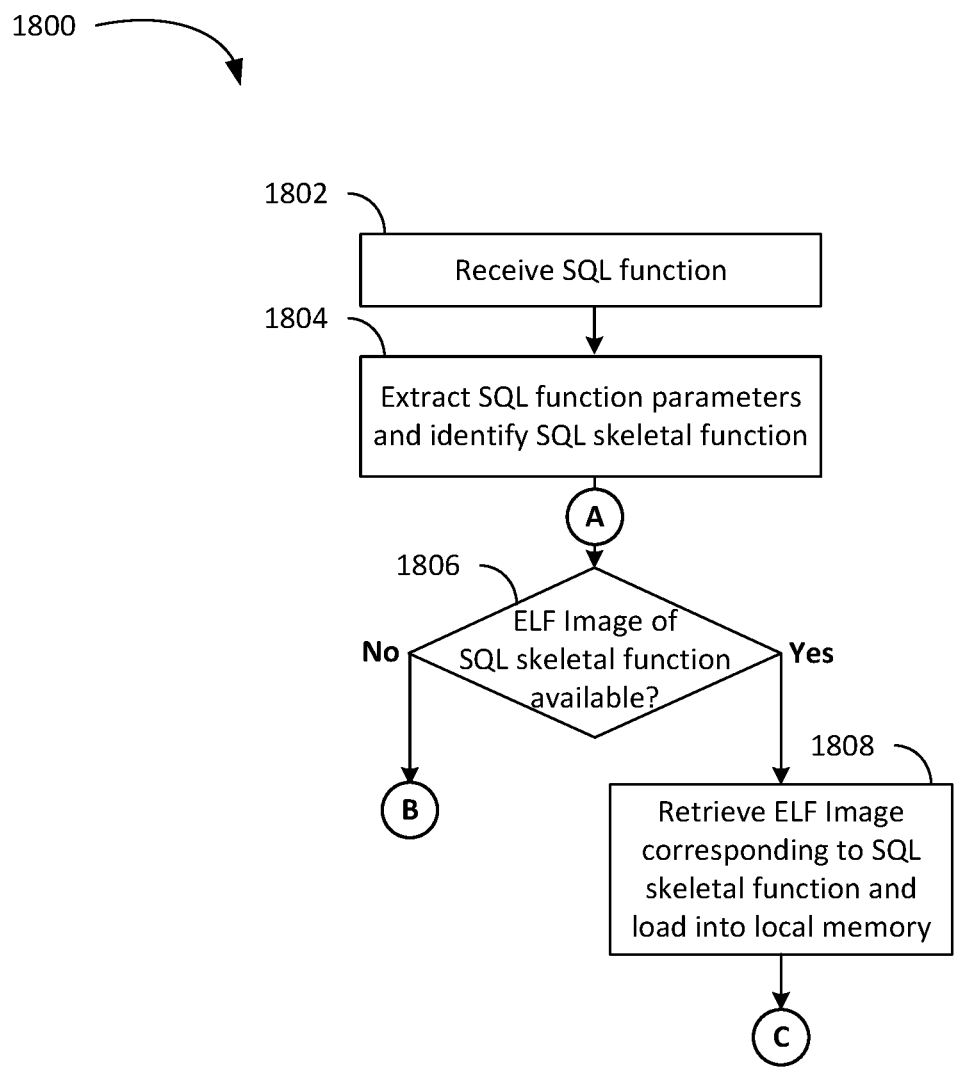
FIG. 18 illustrates a flowchart of a process for determining if a previously compiled skeletal query is available for a particular query, in accordance with some embodiments.

FIG. 18 illustrates a flowchart 1800 of a process for determining if a previously compiled skeletal function is available for a particular function, in accordance with some embodiments.

Flowchart 1800 includes block 1802, which includes receiving a SQL function. For example, as previously described in connection with FIG. 11, SQL function parser 1104 may receive SQL function 1102.

Flowchart 1800 may advance from block 1802 to block 1804, which includes extracting SQL function parameters and identifying the skeletal function. For example, as previously described in connection with FIG. 11, SQL function parser 1104 may be configured to parse function parameters 1108 and pass them to loader 1144, and parse skeletal function ID 1106 and pass it to skeletal function retriever/compiler 1110.

Flowchart 1800 may advance from block 1804 to block 1806, which includes determining whether native or machine code (e.g., an ELF image) of the compiled SQL skeletal function is available (e.g., previously stored for subsequent retrieval). For example, as previously described in connection with FIG. 11, Skeletal Function Retriever/Complier 1110 may be configured to function code database 1152 to see if it contains compiled native code corresponding to the SQL skeletal function. If the determination is NO at block 1806, flowchart 1800 advances to block "B", which is continued in FIG. 20.

If the determination is YES at block 1806, flowchart 1800 advances to block 1808, which includes retrieving the ELF image corresponding to the SQL skeletal function and loading the ELF image into local memory. For example, as previously described in connection with FIG. 11, if native or machine code corresponding to the current SQL function skeleton ID 1112 has previously been compiled and stored in code database 1152, skeletal function retriever/compiler 1110 may retrieve the native or machine code, for example in the form of a stored ELF, and pass it to loader 1144. Flowchart 1800 then advances to block "C", which is continued in FIG. 22.

Figure 19:
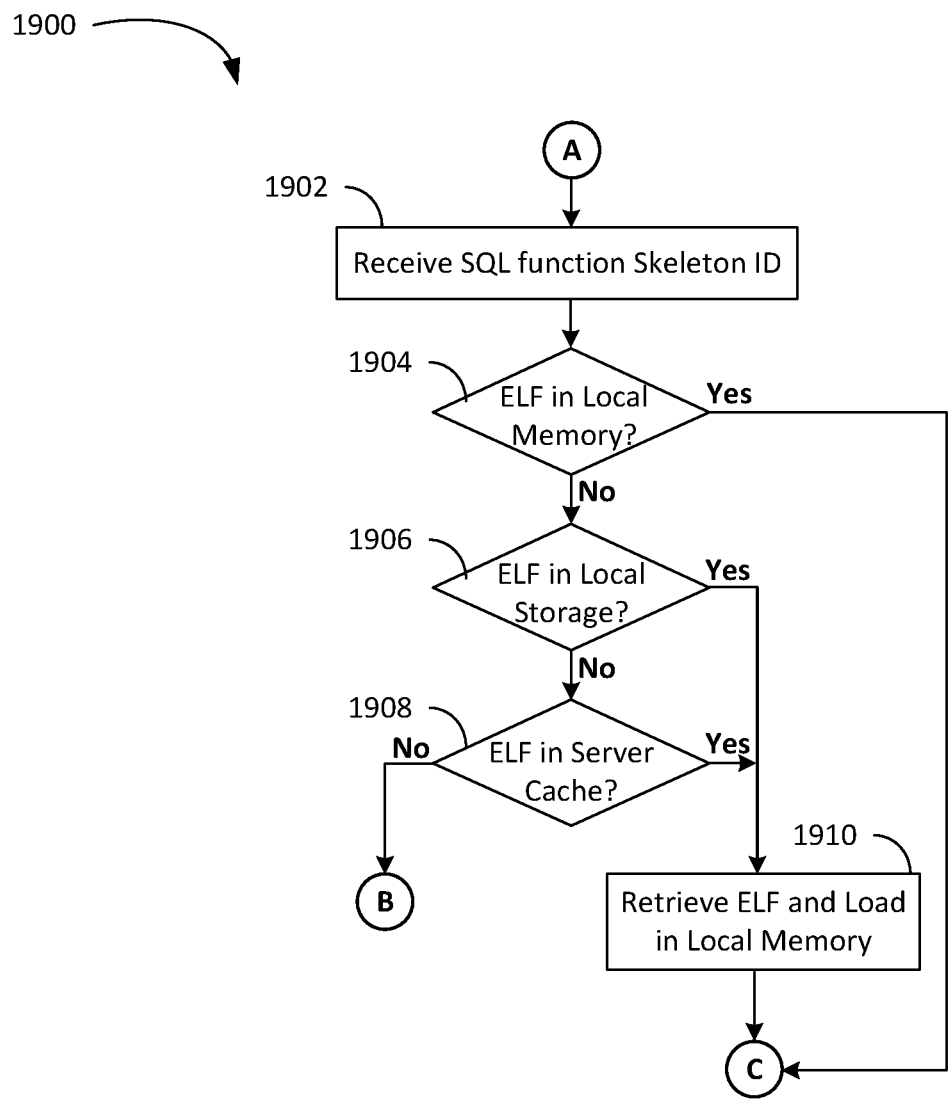
FIG. 19 illustrates a more detailed flowchart of at least a portion of the process of FIG. 18, in accordance with some embodiments.

FIG. 19 illustrates a more detailed flowchart 1900 of at least a portion of the process of FIG. 18, in accordance with some embodiments. For example, the flowchart 1900 illustrates, in more detail, some embodiments of the procedure for at least blocks 1806 and 1808 of FIG. 18. Flowchart 1900 initiates at block "A" from FIG. 18 and advances to block 1902, which includes receiving a SQL function skeleton ID. Such an ID may comprise any indication that serves to positively identify a SQL function skeleton for which a retrieval is attempted. For example, as previously described in connection with FIG. 11, skeletal function retriever/complier 1110 may receive skeletal function ID 1106.

Flowchart 1900 advances from block 1902 to block 1904, which includes determining whether an ELF image (e.g., native or machine code) is stored in local memory, for example, local memory 314, 324 (FIG. 3). If the determination at block 1904 is YES, flowchart 1900 advances to block "C", which is continued in FIG. 22.

If the determination at block 1904 is NO, flowchart 1900 advances from block 1904 to block 1906, which includes determining whether the ELF image (e.g., native or machine code) is stored in local storage, for example, local storage 316, 326 (FIG. 3). If the determination at block 1906 is YES, flowchart 1900 advances to block 1910.

If the determination at block 1906 is NO, flowchart 1900 advances to block 1908, which includes determining whether the ELF image (e.g., native or machine code) is stored in a server cache, for example, server cache 334 (FIG. 3). If the determination at block 1908 is YES, flowchart 1900 advances to block 1910. If the determination at block 1908 is NO, flowchart 1900 advances to block "B", which is continued in FIG. 20.

As noted above, upon arriving at block 1910 a determination has already been made that a corresponding ELF image is available and is currently being stored in a location other than local memory, e.g., in local storage or in server cache. Block 1910 includes retrieving the ELF image and loading it into local memory. For example, as previously described in connection with FIG. 11, loading ELF image into loader 1144. Thus, in flowchart 1900, the corresponding ELF image is either not available in any accessible storage and must be compiled, as will be described in FIG. 22, or is available and was already or is subsequently loaded into local memory where it can be executed.

Figure 20:
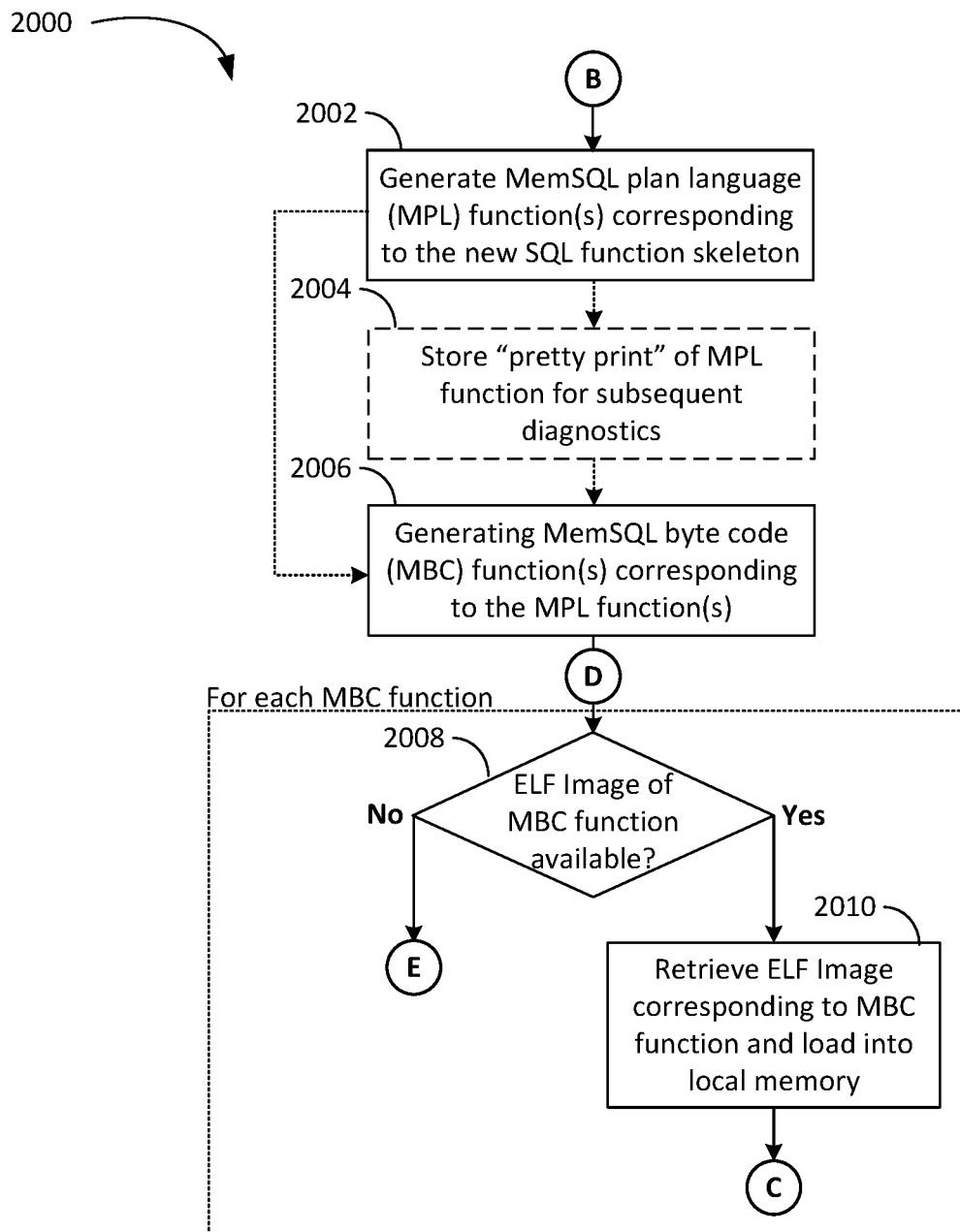
FIG. 20 illustrates a flowchart of a process for compiling a new skeletal function into an intermediate byte code function and determining if that intermediate byte code function has been previously compiled, in accordance with some embodiments.

FIG. 20 illustrates a flowchart 2000 of a process for compiling a new skeletal function into an intermediate byte code function and determining if that intermediate byte code function has been previously compiled, in accordance with some embodiments. Flowchart 2000 initiates at block "B"

from either of FIG. 18 or 19 and advances to block 2002, which includes generating one or more MPL functions corresponding to the new SQL function skeleton. For example, as previously described in connection with FIG. 11, skeletal function retriever/compiler 1110 is configured to pass the new parametrized SQL function skeleton to SQL-to-MPL compiler 1116 if a compiled version is not available, and SQL-to-MPL compiler 1116 is configured to output the corresponding one or more MPL functions.

In some embodiments, flowchart 2000 advances from block 2002 to block 2004, which includes storing a "pretty print" of the MPL function(s) for subsequent use as a diagnostic for debugging. Pretty print is a format that is easily reviewable by a human programmer and provides an easy reference of what was output in the MPL functions. By providing such a pretty print log, mistakes and errors in the compiling process can be easily identified and debugged, thereby reducing programming time and cost.

In such embodiments, flowchart 2000 advances from block 2004 to block 2006. In other embodiments, where block 2004 is not utilized, block 2002 may advance directly to block 2006, which includes generating one or more MBC function(s) corresponding to the one or more MPL function(s). For example, as previously described in connection with FIG. 11, MPL-to-MBC compiler 1120 may be configured to receive the one or more MPL function(s) 1118 and generate and output the one or more MBC function(s) 1122 that correspond to MPL function(s) 1118.

Flowchart 2000 advances from block 2006 to block 2008. Blocks 2008 and 2010 may be carried out for each respective MBC function, or for particular groups of MBC functions simultaneously, defined by the MBC byte code. Block 2008 includes determining whether native or machine code (e.g., an ELF image) of the compiled MBC function(s) is/are available (e.g., previously stored for subsequent retrieval). For example, as previously described in connection with FIG. 11, retriever 1124 may be configured to function code database 1152 to see if it contains compiled code corresponding to the MBC function(s). If the determination is NO at block 2008, flowchart 2000 advances to block "E", which is continued in FIG. 22.

If the determination is YES at block 2008, flowchart 2000 advances to block 2010, which includes retrieving the ELF image corresponding to the MBC function(s) and loading the ELF image into local memory. For example, as previously described in connection with FIG. 11, if native or machine code corresponding to the current MBC function(s) has previously been compiled and stored in code database 1152, retriever 1124 may retrieve the native or machine code, for example in the form of a stored ELF, and pass it to loader 1144. Flowchart 2000 then advances to block "C", which is continued in FIG. 22.

Figure 21:
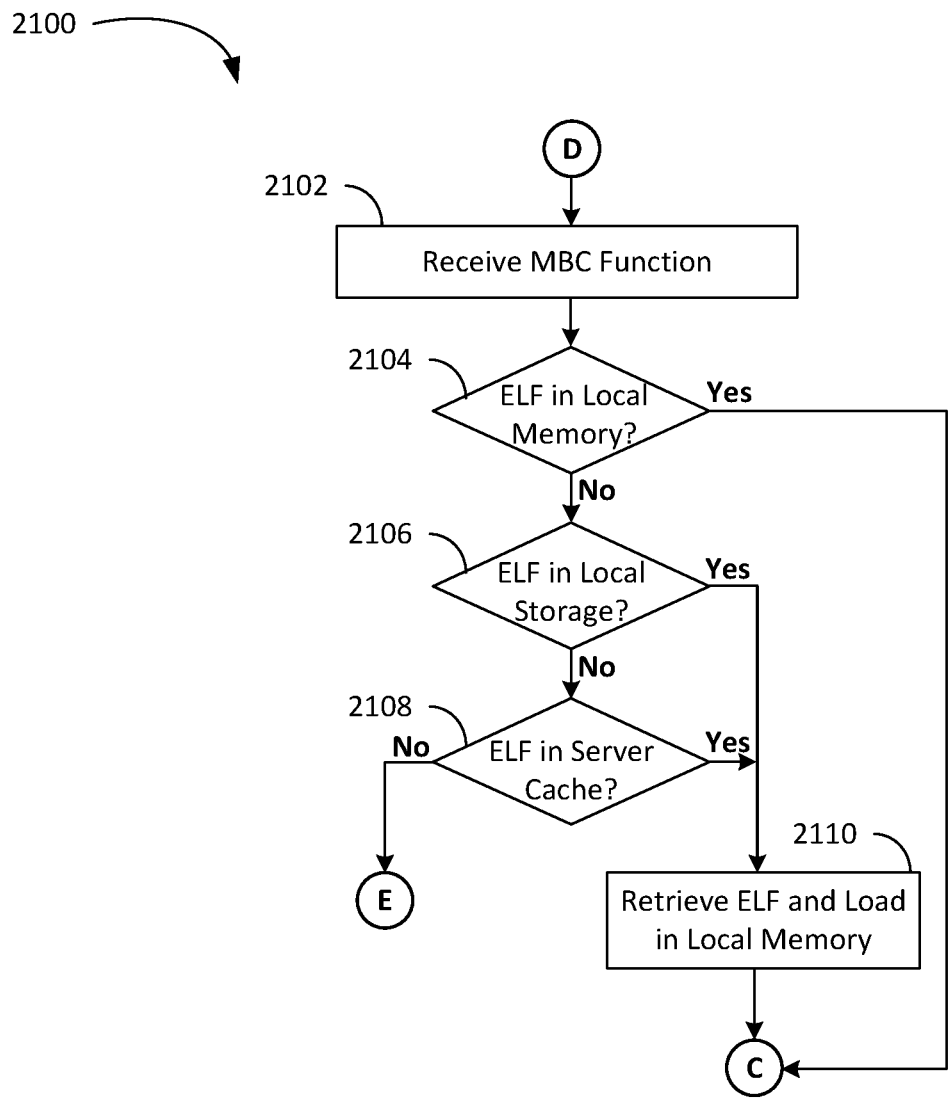
FIG. 21 illustrates a more detailed flowchart of the process of FIG. 20 for determining if the intermediate byte code function has been previously compiled, in accordance with some embodiments.

FIG. 21 illustrates a more detailed flowchart 2100 of the process of FIG. 20 for determining if the intermediate byte code function has been previously compiled, in accordance with some embodiments. For example, the flowchart 2100 illustrates, in more detail, some embodiments of the procedure for at least blocks 2008 and 2010 of FIG. 20. Flowchart 2100 initiates at block "D" from FIG. 20 and advances to block 2102, which includes receiving an MBC function. For example, as previously described in connection with FIG. 11, retriever 1124 may receive MBC function(s) 1122.

Flowchart 2100 advances from block 2102 to block 2104, which includes determining whether an ELF image (e.g., native or machine code) is stored in local memory, for example local memory 314, 324 (FIG. 3). If the determination at block 2104 is YES, flowchart 2100 advances to block "C", which is continued in FIG. 22.

If the determination at block 2104 is NO, flowchart 2100 advances from block 2104 to block 2106, which includes determining whether the ELF image (e.g., native or machine code) is stored in local storage, for example local storage 316, 326 (FIG. 3). If the determination at block 2106 is YES, flowchart 2100 advances to block 2110.

If the determination at block 2106 is NO, flowchart 2100 advances to block 2108, which includes determining whether the ELF image (e.g., native or machine code) is stored in a server cache, for example server cache 334 (FIG. 3). If the determination at block 2108 is YES, flowchart 2100 advances to block 2110. If the determination at block 2108 is NO, flowchart 2100 advances to block "E", which is continued in FIG. 22.

As noted above, upon arriving at block 2110 a determination has already been made that a corresponding ELF image is available and is currently being stored in a location other than local memory, e.g., in local storage or in server cache. Block 2110 includes retrieving the ELF image and loading it into local memory. For example, as previously described in connection with FIG. 11, loading the ELF image into loader 1144. Thus, in flowchart 2100, the corresponding ELF image is either not available in any accessible storage and must be compiled, as will be described in FIG. 22, or is available and was already or is subsequently loaded into local memory where it can be executed.

Figure 22:
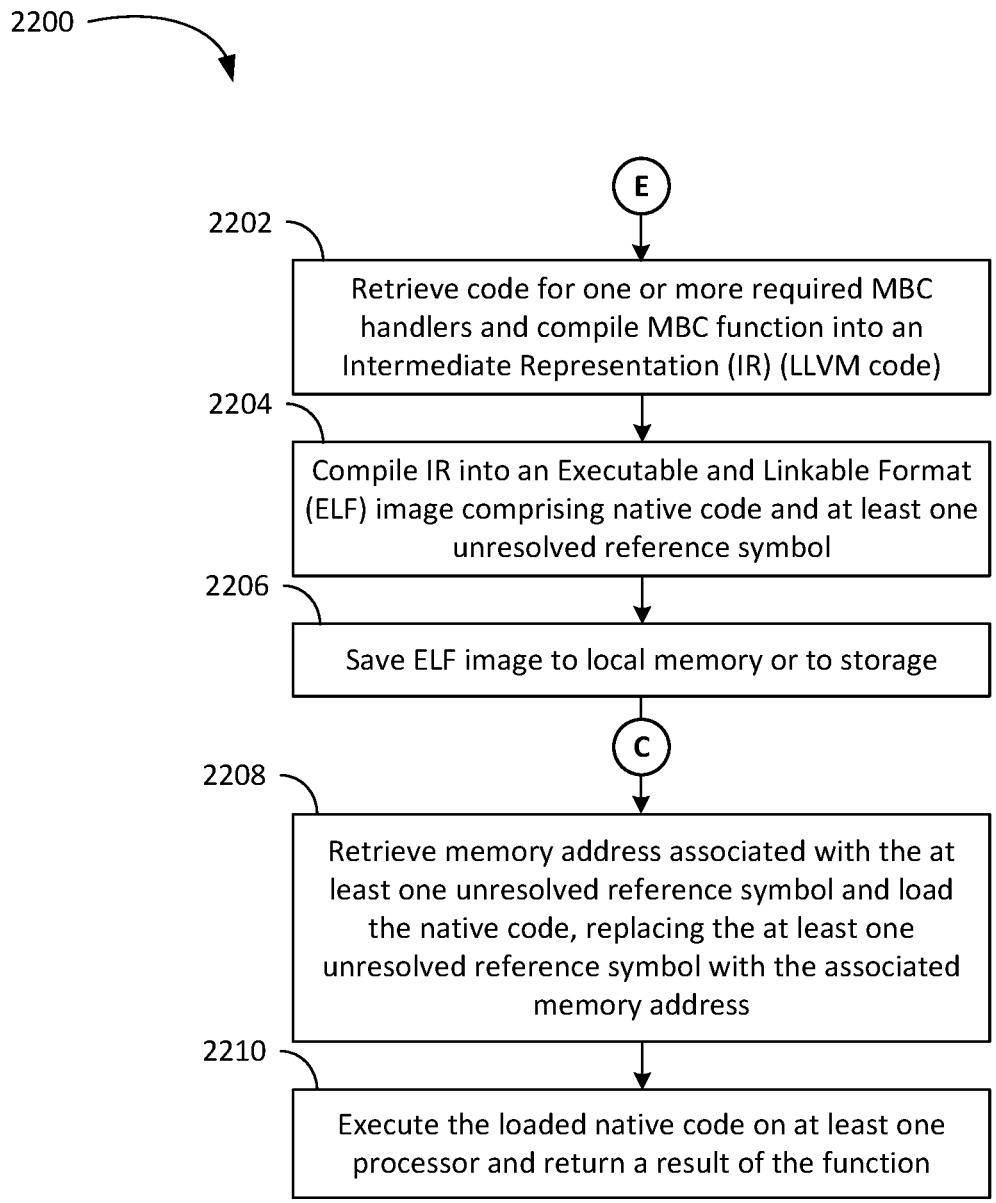
FIG. 22 illustrates a flowchart of a process for compiling an intermediate byte code function into machine code for execution, in accordance with some embodiments.

FIG. 22 illustrates a flowchart 2200 of a process for compiling an intermediate byte code function into machine code for execution, in accordance with some embodiments. Traversals of FIGS. 20 and 21 that flow to block "E", enter flowchart 2200 at block 2202, which includes retrieving code for one or more MBC handlers and compiling the MBC function into an intermediate representation (IR), e.g., low level virtual machine (LLVM) bitcode. For example, as previously described in connection with FIG. 11, front end 1132 of meta-compilation engine 1130 is configured to receive one or more MBC function(s) 1122 for which compiled native or machine code has not been previously compiled and stored for subsequent retrieval. Front end 1132 is also configured to retrieve code, for example from database 1154, for one or more MBC handlers required to compile the one or more MBC function(s) 1122 into LLVM bitcode 1136.

Flowchart 2200 advances from block 2202 to block 2204, which includes compiling the intermediate representation (IR, e.g., LLVM bitcode) into an executable and linkable format (ELF) image comprising native or machine code and at least one unresolved symbol. For example, as previously described in connection with FIG. 11, back end 1134 of meta-compilation engine 1130 is configured to receive LLVM bitcode 1136, and required code handlers in LLBM bitcode 1138, and generate an ELF image comprising native or machine code and at least one unresolved symbol corresponding to the LLVM bitcode 1136, as previously described. In some embodiments, intermediate representations of a plurality of MBC byte code functions may be compiled into an ELF image in the same operations, thereby increasing compilation efficiency.

Flowchart 2200 advances from block 2204 to block 2206, which includes saving the ELF image to a local memory or to storage. For example, as previously described in connection with FIG. 11, ELF image 1140 may be persisted to code database 1152, which may be either centrally located or distributed, in local memory, local storage, server cache, or even server storage. Thus, the next time a retrieval of ELF image 1140 is attempted for a subsequent function, it will not have to be compiled but may instead be retrieved, which saves valuable computational overhead and time in executing subsequent functions.

Flowchart 2200 advances from block 2206 to block 2208, which includes retrieving a memory address associated with the at least one unresolved symbol and load the native code, replacing the at least one unresolved symbol with the associated memory address. For example, as previously described in connection with FIG. 11, loader 1148 is configured to retrieve a memory address at which native or machine code corresponding to the unresolved symbol(s) is stored and replace the unresolved symbol(s) in ELF image 1114, 1128, 1140 with the associated memory address. In this way, compilation time may be reduced in that the native or machine code stored at the memory address need not be transcribed into the ELF image directly. Instead, one or more processors executing the native code may jump directly to the memory address when read, requiring only the time needed to execute the jump during code execution.

Flowchart 2200 advances from block 2208 to block 2210, which includes executing the loaded native or machine code on at least one processor and returning a result of the original SQL function. For example, as previously described in connection with FIG. 11, one or more processors 1148 may execute the native or machine code comprising the one or more memory addresses corresponding to the previously embedded one or more unresolved symbols and return a result of the original SQL function 1102.

In interpreting the present application, it should be understood that the word "comprising" does not exclude the presence of other elements or acts than those listed and that the word "a" or "an" preceding an element does not exclude the presence of a plurality of such elements. Any reference signs do not limit the scope of the entities to which they refer. Several "means" may be represented by the same item or hardware or software implemented structure or function. Each of the disclosed elements may comprise a combination of hardware portions (e.g., including discrete and integrated electronic circuitry) and software portions (e.g., computer programming, instructions or code). Hardware portions may include one or more processors and/or memory, and software portions may be stored on a non-transitory, computer-readable medium, and may be configured to cause such one or more processors to perform some or all of the functions of one or more of the disclosed elements. Hardware portions may be comprised of one or both of analog and digital portions. Any of the disclosed devices or portions thereof may be combined together or separated into further portions unless specifically stated otherwise. No specific sequence of acts is intended to be required unless specifically indicated. The term "plurality of" an element includes two or more of the claimed element, and does not imply any particular range of number of elements; that is, a plurality of elements can be as few as two elements, and can include an immeasurable number of elements.

What is claimed is:

1. A method comprising:
    obtaining a user query in a structured query language, the user query comprising at least one query parameter for selecting data from a content database;
    parsing the user query to identify a skeletal query form of the user query in a first programming language and the at least one query parameter, wherein the skeletal query comprising at least one unresolved object and a function calling the at least one unresolved object;
    generating byte code defining a plurality of functions corresponding to the user query,
    interpreting the byte code using the at least one query parameter, thereby returning a result of the user query satisfying the at least one query parameter,
    generating machine code corresponding to the user query based on the byte code,
    executing the machine code corresponding to the user query using the at least one query parameter if the user query is called again, thereby returning a result of the user query satisfying the at least one query parameter;
    wherein the generating and executing machine code corresponding to the user query comprising:
        on a first pass through the skeletal query:
            binding each respective unresolved object to a respective placeholder object such that the function calls each respective placeholder object and each respective placeholder object is mapped to the respective unresolved object,
            delaying evaluation of the skeletal query until a second pass through the skeletal query;
        on a second pass through the skeletal query, obtaining machine code corresponding to a compiled version of the skeletal query by:
            sequentially obtaining machine code for each respective unresolved object as each respective placeholder is called in the skeletal query; and
    executing the machine code corresponding to the compiled version of the skeletal query, thereby performing at least one operation on the data of the content database.

2. The method of claim 1, wherein:
    the at least one unresolved object comprises a plurality of table variables;
    a first table variable of the plurality of table variables is defined in terms of at least one of:
        a second table variable of the plurality of table variables, or
        a scalar variable;
    the function references the first table variable, thereby calling a nested invocation of the first table variable and the second table variable or the scalar variable; and
    sequentially obtaining machine code for each respective unresolved object comprises unnesting the nested invocation of the first table variable and the second table variable or the scalar variable such that the function refers only to defined tables or literal values.

3. The method of claim 2, wherein the scalar variable is bound to the function at the time the function is assigned to the first table variable such that any subsequent modification to the scalar variable is not utilized when sequentially obtaining machine code for each respective unresolved object.

4. The method of claim 1, wherein obtaining the machine code for each respective unresolved object further comprises:
    for a first subset of respective functions defined by the unresolved objects having corresponding machine code stored in a code database:
        retrieving the corresponding machine code for the respective function from the code database; and
        aggregating the corresponding machine code for each of the first subset of respective functions defined by the unresolved objects, thereby forming the machine code for each respective unresolved object.

5. The method of claim 1, wherein obtaining the machine code for each respective unresolved object further comprises:
for a second subset of respective functions defined by the unresolved objects that do not have corresponding machine code stored in a code database:
generating code in a second programming language corresponding to a compiled version of the respective function,
generating byte code corresponding to a compiled version of the code in the second programming language, and
obtaining the corresponding machine code for the respective function based on the byte code; and
aggregating the corresponding machine code for each of the second subset of respective functions defined by the unresolved objects, thereby forming the machine code for each respective unresolved object.

6. The method of claim 5, wherein obtaining the machine code corresponding to the compiled version of the respective function based on the byte code comprises:
for a second subset of respective functions defined by the byte code having corresponding machine code stored in the code database, retrieving the corresponding machine code for the respective functions; and
aggregating the corresponding machine code for each respective function defined by the byte code.

7. The method of claim 5, further comprising storing the corresponding machine code for the respective function based on the byte code in the code database.

8. The method of claim 1, further comprising storing the machine code corresponding to the compiled version of the skeletal query in a code database.

9. The method of claim 1, wherein the code database is stored in at least one of a local memory, a local storage, and a server cache.

10. The method of claim 1, wherein the skeletal query comprises one of: a stored procedure, a user-defined function, a table-valued function and a user-defined aggregate function and the first programming language is a structured query language.

11. The method of claim 1, further comprising defining the skeletal query in a structured query language.

12. A non-transitory computer readable medium comprising instructions which, when executed by a processing system, cause the processing system to:
obtain a user query in a structured query language, the user query comprising at least one query parameter for selecting data from a content database;
parse the user query to identify a skeletal query form of the user query in a first programming language and the at least one query parameter, wherein the skeletal query comprising at least one unresolved object and a function calling the at least one unresolved object;
generate byte code defining a plurality of functions corresponding to the user query,
interpret the byte code using the at least one query parameter, thereby returning a result of the user query satisfying the at least one query parameter,
generate machine code corresponding to the user query based on the byte code,
execute the machine code corresponding to the user query using the at least one query parameter if the user query is called again, thereby returning a result of the user query satisfying the at least one query parameter;
wherein generate and execute machine code corresponding to the user query comprises:
on a first pass through the skeletal query:
bind each respective unresolved object to a respective placeholder object such that the function calls each respective placeholder object and each respective placeholder object is mapped to the respective unresolved object,
delay evaluation of the skeletal query until a second pass through the skeletal query;
on a second pass through the skeletal query, obtain machine code corresponding to a compiled version of the skeletal query by:
sequentially obtaining machine code for each respective unresolved object as each respective placeholder is called in the skeletal query; and
execute the machine code corresponding to the compiled version of the skeletal query, thereby performing at least one operation on the data of the content database.

13. The medium of claim 12, wherein:
the at least one unresolved object comprises a plurality of table variables;
a first table variable of the plurality of table variables is defined in terms of at least one of:
a second table variable of the plurality of table variables, or
a scalar variable;
the function references the first table variable, thereby calling a nested invocation of the first table variable and the second table variable or the scalar variable; and
sequentially obtaining machine code for each respective unresolved object comprises unnesting the nested invocation of the first table variable and the second table variable or the scalar variable such that the function refers only to defined tables or literal values.

14. The medium of claim 13, wherein the scalar variable is bound to the function at the time the function is assigned to the first table variable such that any subsequent modification to the scalar variable is not utilized when sequentially obtaining machine code for each respective unresolved object.

15. The medium of claim 12, wherein obtaining the machine code for each respective unresolved object further comprises:
for a first subset of respective functions defined by the unresolved objects having corresponding machine code stored in a code database:
retrieving the corresponding machine code for the respective function from the code database; and
aggregating the corresponding machine code for each of the first subset of respective functions defined by the unresolved objects, thereby forming the machine code for each respective unresolved object.

16. The medium of claim 15, wherein obtaining the machine code corresponding to the compiled version of the respective function based on the byte code comprises:
for a second subset of respective functions defined by the byte code having corresponding machine code stored in the code database, retrieving the corresponding machine code for the respective functions; and
aggregating the corresponding machine code for each respective function defined by the byte code.

17. The medium of claim 15, further comprising storing the corresponding machine code for the respective function based on the byte code in the code database.

18. The medium of claim 12, wherein obtaining the machine code for each respective unresolved object further comprises:

for a second subset of respective functions defined by the unresolved objects that do not have corresponding machine code stored in a code database:
generating code in a second programming language corresponding to a compiled version of the respective function,
generating byte code corresponding to a compiled version of the code in the second programming language, and
obtaining the corresponding machine code for the respective function based on the byte code; and
aggregating the corresponding machine code for each of the second subset of respective functions defined by the unresolved objects, thereby forming the machine code for each respective unresolved object.

19. The medium of claim 12, further comprising storing the machine code corresponding to the compiled version of the skeletal query in a code database.

20. The medium of claim 12, wherein the code database is stored in at least one of a local memory, a local storage, and a server cache.

21. The medium of claim 12, wherein the skeletal query comprises one of: a stored procedure, a user-defined function, a table-valued function and a user-defined aggregate function and the first programming language is a structured query language.

22. A system, comprising:
a processing system configured to:
obtain a user query in a structured query language, the user query comprising at least one query parameter for selecting data from a content database;
parse the user query to identify a skeletal query form of the user query in a first programming language and the at least one query parameter, wherein the skeletal query comprising at least one unresolved object and a function calling the at least one unresolved object;
generate byte code defining a plurality of functions corresponding to the user query,
interpret the byte code using the at least one query parameter, thereby returning a result of the user query satisfying the at least one query parameter,
generate machine code corresponding to the user query based on the byte code,
execute the machine code corresponding to the user query using the at least one query parameter if the user query is called again, thereby returning a result of the user query satisfying the at least one query parameter;
wherein the generate and execute machine code corresponding to the user query comprising:
on a first pass through the skeletal query:
bind each respective unresolved object to a respective placeholder object such that the function calls each respective placeholder object and each respective placeholder object is mapped to the respective unresolved object,
delay evaluation of the skeletal query until a second pass through the skeletal query;
on a second pass through the skeletal query:
obtain machine code corresponding to a compiled version of the skeletal query by:
sequentially obtaining machine code for each respective unresolved object as each respective placeholder is called in the skeletal query; and
execute the machine code corresponding to the compiled version of the skeletal query, thereby performing at least one operation on the data of the content database.

23. The system of claim 22, wherein:
the at least one unresolved object comprises a plurality of table variables;
a first table variable of the plurality of table variables is defined in terms of at least one of:
a second table variable of the plurality of table variables, or
a scalar variable;
the function references the first table variable, thereby calling a nested invocation of the first table variable and the second table variable or the scalar variable; and
sequentially obtaining machine code for each respective unresolved object comprises unnesting the nested invocation of the first table variable and the second table variable or the scalar variable such that the function refers only to defined tables or literal values.

24. The system of claim 23, wherein the scalar variable is bound to the function at the time the function is assigned to the first table variable such that any subsequent modification to the scalar variable is not utilized when sequentially obtaining machine code for each respective unresolved object.

25. The system of claim 22, wherein obtaining the machine code for each respective unresolved object further comprises:
for a first subset of respective functions defined by the unresolved objects having corresponding machine code stored in a code database:
retrieving the corresponding machine code for the respective function from the code database; and
aggregating the corresponding machine code for each of the first subset of respective functions defined by the unresolved objects, thereby forming the machine code for each respective unresolved object.

26. The system of claim 22, wherein obtaining the machine code for each respective unresolved object further comprises:
for a second subset of respective functions defined by the unresolved objects that do not have corresponding machine code stored in a code database:
generating code in a second programming language corresponding to a compiled version of the respective function,
generating byte code corresponding to a compiled version of the code in the second programming language, and
obtaining the corresponding machine code for the respective function based on the byte code; and
aggregating the corresponding machine code for each of the second subset of respective functions defined by the unresolved objects, thereby forming the machine code for each respective unresolved object.

27. The system of claim 26, wherein obtaining the machine code corresponding to the compiled version of the respective function based on the byte code comprises:
for a second subset of respective functions defined by the byte code having corresponding machine code stored in the code database, retrieving the corresponding machine code for the respective functions; and
aggregating the corresponding machine code for each respective function defined by the byte code.

28. The system of claim 26, further comprising storing the corresponding machine code for the respective function based on the byte code in the code database.

29. The system of claim 22, further comprising storing the machine code corresponding to the compiled version of the skeletal query in a code database.

30. The system of claim 22, wherein the code database is stored in at least one of a local memory, a local storage, and a server cache.

31. The system of claim 22, wherein the skeletal query comprises one of: a stored procedure, a user-defined function, a table-valued function and a user-defined aggregate function and the first programming language comprises a structured query language.

* * * * *